United States Patent
Shishikura

(10) Patent No.: US 11,555,160 B2
(45) Date of Patent: Jan. 17, 2023

(54) GREASE COMPOSITION

(71) Applicant: IDEMITSU KOSAN CO., LTD., Chiyoda-ku (JP)

(72) Inventor: Akihiro Shishikura, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/435,733

(22) PCT Filed: Feb. 27, 2020

(86) PCT No.: PCT/JP2020/007937
§ 371 (c)(1),
(2) Date: Sep. 2, 2021

(87) PCT Pub. No.: WO2020/179595
PCT Pub. Date: Sep. 10, 2020

(65) Prior Publication Data
US 2022/0135897 A1    May 5, 2022

(30) Foreign Application Priority Data

Mar. 6, 2019  (JP) .............................. JP2019-040945

(51) Int. Cl.
*C10M 169/00*  (2006.01)
*C10M 101/02*  (2006.01)
(Continued)

(52) U.S. Cl.
CPC ........ *C10M 169/00* (2013.01); *C10M 101/02* (2013.01); *C10M 107/02* (2013.01);
(Continued)

(58) Field of Classification Search
CPC .................. C10M 169/06; C10M 101/02; C10M 105/04; C10M 105/06; C10M 105/18;
(Continued)

(56) References Cited

U.S. PATENT DOCUMENTS

| | | | |
|---|---|---|---|
| 2017/0253826 A1* | 9/2017 | Suetsugu | ............. C10M 115/08 |
| 2017/0275558 A1* | 9/2017 | Saito | .................... C10M 143/02 |
| 2018/0037842 A1 | 2/2018 | Suetsugu et al. | |

FOREIGN PATENT DOCUMENTS

| | | |
|---|---|---|
| CN | 1997709 A | 7/2007 |
| CN | 106243992 A | 12/2016 |

(Continued)

OTHER PUBLICATIONS

Combined Chinese Office Action and Search Report dated Jun. 20, 2022, in corresponding Chinese Patent Application No. 202080018720.4 (with English Translation and English Translation of Category of Cited Documents). 18 pages.

(Continued)

*Primary Examiner* — Vishal V Vasisth
(74) *Attorney, Agent, or Firm* — Oblon, McClelland, Maier & Neustadt, L.L.P.

(57) ABSTRACT

The present invention relates to provision of an extreme pressure agent-containing grease composition using, as a thickener, a urea-based thickener, the grease composition being excellent in both torque transmitting efficiency and leakage prevention performance and also excellent in wear resistance and load resistance. The grease composition contains a base oil (A), a urea-based thickener (B), and an extreme pressure agent (C), wherein
  particles containing the urea-based thickener (B) in the grease composition satisfies the following requirement (I):
Requirement (I): an arithmetic average particle diameter of the particles on an area basis as measured by the laser diffraction/scattering method is 2.0 μm or less, and
  the extreme pressure agent (C) is at least one selected from an organic metal-based extreme pressure agent, a sulfur-based extreme pressure agent, a phosphorus-
(Continued)

based extreme pressure agent, and a sulfur-phosphorus-based extreme pressure agent.

13 Claims, 4 Drawing Sheets

(51) Int. Cl.
*C10M 107/02* (2006.01)
*C10M 115/08* (2006.01)
*C10M 129/40* (2006.01)
*C10M 133/12* (2006.01)
*C10M 135/10* (2006.01)
*C10M 135/18* (2006.01)
*C10M 137/08* (2006.01)
*C10M 137/10* (2006.01)
*C10M 141/10* (2006.01)
*C10M 159/12* (2006.01)
*F16H 57/04* (2010.01)
*C10N 20/00* (2006.01)
*C10N 20/02* (2006.01)
*C10N 30/06* (2006.01)
*C10N 30/10* (2006.01)
*C10N 30/12* (2006.01)
*C10N 30/14* (2006.01)
*C10N 50/10* (2006.01)

(52) U.S. Cl.
CPC ........ *C10M 115/08* (2013.01); *C10M 129/40* (2013.01); *C10M 133/12* (2013.01); *C10M 135/10* (2013.01); *C10M 135/18* (2013.01); *C10M 137/08* (2013.01); *C10M 137/105* (2013.01); *C10M 141/10* (2013.01); *C10M 159/12* (2013.01); *F16H 57/0464* (2013.01); *C10M 2203/1025* (2013.01); *C10M 2205/0206* (2013.01); *C10M 2207/126* (2013.01); *C10M 2215/1026* (2013.01); *C10M 2215/26* (2013.01); *C10M 2219/024* (2013.01); *C10M 2219/044* (2013.01); *C10M 2219/068* (2013.01); *C10M 2223/043* (2013.01); *C10M 2223/045* (2013.01); *C10M 2223/047* (2013.01); *C10N 2020/02* (2013.01); *C10N 2020/055* (2020.05); *C10N 2030/06* (2013.01); *C10N 2030/10* (2013.01); *C10N 2030/12* (2013.01); *C10N 2030/14* (2013.01); *C10N 2050/10* (2013.01)

(58) Field of Classification Search
CPC .................. C10M 105/32; C10M 107/02; C10M 115/08; C10M 135/00; C10M 137/00; F16H 57/04; C10N 2020/00; C10N 2020/02; C10N 2020/06; C10N 2030/00; C10N 2040/04; C10N 2050/10
See application file for complete search history.

(56) References Cited

FOREIGN PATENT DOCUMENTS

| CN | 107207993 A | 9/2017 |
| CN | 108715769 A | 10/2018 |
| EP | 3851506 A1 | 7/2021 |
| EP | 3919592 A1 | 12/2021 |
| JP | 11-21580 A | 1/1999 |
| JP | 2004-75041 A | 3/2004 |
| JP | 2004-132480 A | 4/2004 |
| JP | 2004-231714 A | 8/2004 |
| JP | 2005-47938 A | 2/2005 |
| JP | 2005-247971 A | 9/2005 |
| JP | 2008-309336 A | 12/2008 |
| JP | 2011-42747 A | 3/2011 |
| JP | 2017-115109 A | 6/2017 |
| JP | 2018-115235 A | 7/2018 |
| WO | WO 2016/125859 A1 | 8/2016 |
| WO | WO 2018/101340 A1 | 6/2018 |
| WO | WO 2018/216569 A1 | 11/2018 |

OTHER PUBLICATIONS

International Search Report dated May 26, 2020 in PCT/JP2020/007937 filed on Feb. 27, 2020. 3 pages.
Extended European Search Report dated Oct. 26, 2022, in European Patent Application No. 20765715.6.
Shishikura A et al., "Effect of Grease Structure on Leakage of Grease from Speed Reducing Gear for Robot", 2016 IEEE International Conference on Robotics And Biomimetics, IEEE, Dec. 3, 2016, pp. 1754-1757.
Michiharu Naka et al., "Effects of Urea Grease Composition on the Seizure of Ball Gearings", Tribology Transactions, vol. 41, No. 3, Jan. 1, 1998, pp. 387-391.
Chinese Office Action dated Nov. 23, 2022, in Chinese Patent Application No. 202080018720.4 (with English Translation).

* cited by examiner

GREASE COMPOSITION

This application is a 371 of PCT/JP2020/007937 filed Feb. 27, 2020.

TECHNICAL FIELD

The present invention relates to a grease composition. In more detail, the present invention relates to a grease composition containing an extreme pressure agent.

BACKGROUND ART

A grease is easy to achieve sealing as compared with lubricating oils and is able to achieve downsizing and weight reduction of a machine to be applied. Accordingly, the grease has hitherto been widely used for lubrication of a variety of sliding portions of automobiles, electrical machinery and appliances, industrial machinery, industrial machines, and so on.

In recent years, the grease is also used in a speed reducer to be used for industrial robots and the like, a speed increaser to be used for wind turbine generator systems, etc., and so on.

The speed reducer has such a mechanism that by applying a torque to an input side, the speed is reduced toward an output side, thereby transmitting the torque.

The speed increaser has such a mechanism that by applying a torque to the input side, the speed is increased toward the output side, thereby transmitting the torque.

The grease to be used in the lubricating sites of the speed reducer and the speed increaser is required to have excellent torque transmitting efficiency from the viewpoint of transmitting the torque applied to the input side toward the output side without being wasted.

Here, a grease for which excellent torque transmitting efficiency is required as in the grease to be used in the lubricating sites of the speed reducer and the speed increaser, etc. is also required to have a capacity of reducing wear and seizure in the lubricating sites as far as possible taking into consideration the matter that a high load is liable to be applied in the lubricating sites at the time of torque transmission.

For example, PTL 1 describes that by using a grease composition containing a base oil, a thickener, molybdenum dithiophosphate, and a calcium salt, such as calcium sulfonate, damages of a metal contact part at a high temperature are reduced, thereby enabling a speed reducer to have a long life.

CITATION LIST

Patent Literature

PTL 1: JP 2011-042747 A

SUMMARY OF INVENTION

Technical Problem

Now, in the case of preparing a grease which is excellent in torque transmitting efficiency, it is general to increase a worked penetration to provide a soft grease. But, in the case of using a soft grease with a high worked penetration, there is involved such a problem that leakage prevention performance of the grease is lowered. When a grease in which the leakage prevention performance is inferior is used, the grease supply amount in a lubricating site is gradually decreased, so that there is a concern that wear and seizure are liable to be generated in a member constituting the lubricating site.

In consequence, though it is desired to improve the leakage prevention performance of the grease, there was involved such a problem that when the worked penetration of the grease is increased in order to improve the torque transmitting efficiency of the grease, the leakage prevention performance of the grease cannot be thoroughly secured, and as a result, the wear resistance and the load resistance cannot be thoroughly secured, too.

Here, in view of the fact that a grease using, as the thickener, a urea-based thickener is excellent in heat resistance and oxidation stability, in recent years, it has been being used for lubrication of various sliding portions of automobiles, electrical machinery and appliances, industrial machinery, industrial machines, and so on. However, there was involved such a problem that even when an extreme pressure agent is blended in the grease using, as the thickener, a urea-based thickener, the wear resistance and the load resistance cannot be thoroughly improved.

An object of the present invention is to provide a grease composition that is an extreme pressure agent-containing grease composition using, as a thickener, a urea-based thickener, the grease composition being excellent in both torque transmitting efficiency and leakage prevention performance and also excellent in wear resistance and load resistance.

Solution to Problem

In a grease composition containing a base oil and a urea-based thickener, the present inventor paid attention to a particle diameter of particles containing the urea-based thickener in the grease composition and also paid attention to a kind of the extreme pressure agent. Then, it has been found that a grease composition in which the foregoing particles are regulated such that an arithmetic average particle diameter on an area basis as measured by the laser diffraction/scattering method falls within a specified range, and a specified extreme pressure agent is blended is able to solve the aforementioned problem, thereby leading to accomplishment of the present invention.

Specifically, the present invention relates to the following [1] to [12].

[1] A grease composition containing a base oil (A), a urea-based thickener (B), and an extreme pressure agent (C), wherein particles containing the urea-based thickener (B) in the grease composition satisfies the following requirement (I):

Requirement (I): an arithmetic average particle diameter of the particles on an area basis as measured by the laser diffraction/scattering method is 2.0 μm or less, and the extreme pressure agent (C) is at least one selected from an organic metal-based extreme pressure agent, a sulfur-based extreme pressure agent, a phosphorus-based extreme pressure agent, and a sulfur-phosphorus-based extreme pressure agent.

[2] The grease composition as set forth in the above [1], wherein the particles containing the urea-based thickener (B) in the grease composition further satisfies the following requirement (II);

Requirement (II); a specific surface area of the particles as measured by the laser diffraction/scattering method is $0.5 \times 10^5$ $cm^2/cm^3$ or more.

[3] The grease composition as set forth in the above [1] or [2], wherein the content of the extreme pressure agent (C) is 0.1 to 10% by mass on the basis of the total amount of the grease composition.
[4] The grease composition as set forth in any of the above [1] to [3], wherein the base oil (A) is at least one selected from a mineral oil, a hydrocarbon-based oil, an aromatic oil, an ester-based oil, and an ether-based oil.
[5] The grease composition as set forth in any of the above [1] to [4], wherein a kinematic viscosity at 40° C. of the base oil (A) is 10 to 400 mm²/s.
[6] The grease composition as set forth in any of the above [1] to [5], wherein the content of the urea-based thickener (B) is 1 to 15% by mass on the basis of the total amount of the grease composition.
[7] The grease composition as set forth in any of the above [1] to [6], wherein a worked penetration at 25° C. is 240 to 450.
[8] The grease composition as set forth in any of the above [1] to [7], wherein the urea-based thickener (B) is at least one selected from diurea compounds represented by the following formula (b1):

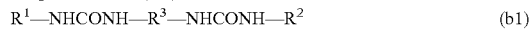

wherein $R^1$ and $R^2$ each independently represent a monovalent hydrocarbon group having 6 to 24 carbon atoms; $R^1$ and $R^2$ may be the same as or different from each other; and $R^3$ represents a divalent aromatic hydrocarbon group having 6 to 18 carbon atoms.
[9] The grease composition as set forth in any of the above [1] to [8], further containing at least one additive (D) selected from an antioxidant, a rust inhibitor, a dispersant, and a metal deactivator.
[10] A speed reducer including the grease composition as set forth in any of the above [1] to [9] in a lubricating site.
[11] A speed increaser including the grease composition as set forth in any of the above [1] to [9] in a lubricating site.
[12] A lubricating method including lubricating a lubricating site of a speed reducer or a speed increased with the grease composition as set forth in any of the above [1] to [9].

Advantageous Effects of Invention

In accordance with the present invention, it is possible to provide a grease composition that is an extreme pressure agent-containing grease composition using, as a thickener, a urea-based thickener, the grease composition being excellent in both torque transmitting efficiency and leakage prevention performance and also excellent in wear resistance and load resistance.

DESCRIPTION OF EMBODIMENTS

Figure 1:
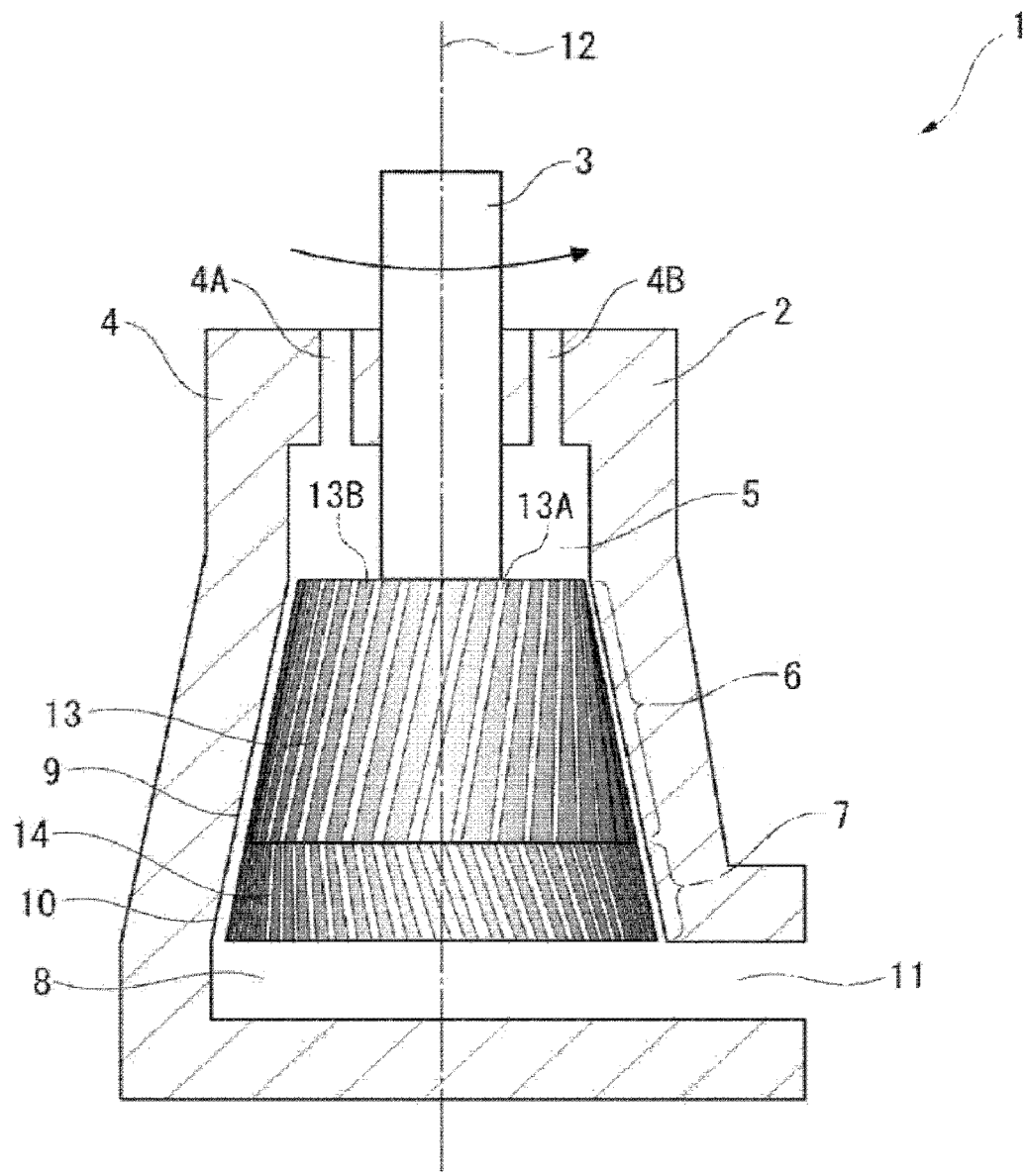
FIG. 1 is a schematic cross-sectional view of a grease manufacturing apparatus which can be used in one embodiment of the present invention.

In this specification, regarding a preferred numerical value range (for example, a range of the content or the like), a lower limit value and an upper limit value that are expressed in stages can be combined each independently. For example, from an expression of "preferably 10 to 90, and more preferably 30 to 60", by combining the "preferred lower limit value (10)" and the "more preferred upper limit value (60)", a suitable range can also be conceived as "10 to 60".

In this specification, the numerical values in the Examples are a numerical value used as an upper limit value or a lower limit value.

[Grease Composition]

The grease composition of the present invention contains a base oil (A), a urea-based thickener (B), and an extreme pressure agent (C).

The extreme pressure agent (C) is at least one selected from an organic metal-based extreme pressure agent, a sulfur-based extreme pressure agent, a phosphorus-based extreme pressure agent, and a sulfur-phosphorus-based extreme pressure agent.

In the following description, the "base oil (A)", the "urea-based thickener (B)", and the "extremely pressure agent (C)" are also referred to as "component (A)", "component (B)", and "component (C)", respectively.

In the grease composition of one embodiment of the present invention, the total content of the components (A), (B), and (C) is preferably 65% by mass or more, more preferably 75% by mass or more, still more preferably 85% by mass or more, yet still more preferably 90% by mass or more, and even yet still more preferably 95% by mass or more. In addition, it is typically 100% by mass or less, preferably less than 100% by mass, more preferably 99% by mass or less, and still more preferably 98% by mass or less.

The grease composition of one embodiment of the present invention may contain components other than the components (A), (B), and (C) within a range where the effects of the present invention are not impaired.

<Requirement (I)>

In the grease composition of the present invention, particles containing the urea-based thickener (B) in the grease composition satisfies the following requirement (I):

Requirement (I): an arithmetic average particle diameter of the particles on an area basis as measured by the laser diffraction/scattering method is 2.0 μm or less.

The requirement (I) is a parameter expressing a state of aggregation of the urea-based thickener (B) in the grease composition.

Here, the term "particles containing the urea-based thickener (B)" as an object for measurement by the laser diffraction/scattering method refers to particles in which the urea-based thickener (B) contained in the grease composition aggregates.

In the case where an additive other than the urea-based thickener (B) is contained in the grease composition, the particle diameter prescribed in the requirement (I) can be obtained through measurement of a grease composition prepared under the same conditions without being blended with the foregoing additive by the laser diffraction/scattering method. However, in the case where the foregoing additive is liquid at room temperature (25° C.), or in the case where the additive is dissolved in the base oil (A), it does not matter if a grease composition having the additive blended therein is an object for measurement.

The urea-based thickener (B) is typically obtained by reacting an isocyanate compound with a monoamine. However, since the reaction rate is very fast, the urea-based thickener (B) aggregates, whereby large particles (micelle particles, so-called "lumps") are liable to be formed in excess. As a result of extensive and intensive investigations made by the present inventor, it has been noted that when the particle diameter prescribed in the requirement (I) is more than 2.0 μm, in the case of increasing the worked penetration of the grease composition, the leakage prevention performance of the grease composition cannot be secured. On the other hand, it has been noted that in the case of decreasing the worked penetration of the grease composition, though the leakage prevention performance of the grease composition can be secured, the torque transmitting efficiency is inferior. Namely, it has been noted that when the particle diameter prescribed in the requirement (I) is more than 2.0 μm, it is difficult to provide a grease composition which is excellent in both the torque transmitting efficiency and the leakage prevention performance.

In contrast, as a result of extensive and intensive investigations made by the present inventor, it has been noted that by miniaturizing the particle diameter prescribed in the requirement (I) to an extent of 2.0 μm or less, even in the case of increasing the worked penetration of the grease composition, the leakage prevention performance of the grease composition can be made excellent, and a grease composition which is excellent in both the torque transmitting efficiency and the leakage prevention performance can be provided. As a result, it has been noted that the grease composition is also excellent in wear resistance and load resistance. Moreover, it has also been noted that by miniaturizing the particle diameter prescribed in the requirement (I) to an extent of 2.0 μm or less, when blending a specified extreme pressure agent (C), the effect of the extreme pressure agent (C) can be made excellent, and the wear resistance and the load resistance can be greatly enhanced.

It may be guessed that this effect is brought by the fact that by miniaturizing the particle diameter prescribed in the requirement (I) to an extent of 2.0 μm or less, the particles containing the urea-based thickener (B) becomes easy to come into a lubricating site (frictional surface) and are hardly removed from the lubricating site, whereby a holding power of the grease composition in the lubricating site is improved. In addition, by miniaturizing the particle diameter prescribed in the requirement (I) to an extent of 2.0 μm or less, the holding power of the base oil (A) by the foregoing particles is improved. Accordingly, it may be guessed that not only the base oil (A) is spread well in the lubricating site (frictional surface), but also accompanying this, an action to spread well the extreme pressure agent (C) in the lubricating site is improved, whereby the wear resistance and the load resistance of the grease composition are improved, too.

From the aforementioned viewpoint, in the grease composition of one embodiment of the present invention, the particle diameter prescribed in the requirement (I) is preferably 1.5 μm or less, more preferably 1.0 μm or less, still more preferably 0.9 μm or less, yet still more preferably 0.8 μm or less, even yet still more preferably 0.7 μm or less, even still more preferably 0.6 μm or less, even still more further preferably 0.5 μm or less, and even yet still further preferably 0.4 μm or less. In addition, it is typically 0.01 μm or more.

<Requirement (II)>

Here, it is preferred that the grease composition of one embodiment of the present invention further satisfies the following requirement (II):

Requirement (II): a specific surface area of the particles as measured by the laser diffraction/scattering method is $0.5 \times 10^5$ cm$^2$/cm$^3$ or more.

The specific surface area prescribed in the requirement (II) is a secondary index expressing a state of miniaturization of the particles containing the urea-based thickener (B) in the grease composition and presence of large particles (lumps). That is, by satisfying the requirement (I) and further satisfying the requirement (II), it is revealed that the state of miniaturization of the particles containing the urea-based thickener (B) in the grease composition is more favorable, and the presence of large particles (lumps) is more suppressed. In consequence, it is easy to provide a grease composition which is excellent in both the torque transmitting efficiency and the leakage prevention performance, and in which the extreme pressure agent (C) becomes effective, so that the wear resistance and the load resistance are more excellent.

From the aforementioned viewpoint, the specific surface area prescribed in the requirement (II) is preferably $0.7 \times 10^5$ cm$^2$/cm$^3$ or more, more preferably $0.8 \times 10^5$ cm$^2$/cm$^3$ or more, still more preferably $1.2 \times 10^5$ cm$^2$/cm$^3$ or more, yet still more preferably $1.5 \times 10^5$ cm$^2$/cm$^3$ or more, even yet still more preferably $1.8 \times 10^5$ cm$^2$/cm$^3$ or more, and even still more preferably $2.0 \times 10^5$ cm$^2$/cm$^3$ or more. The specific surface area is typically $1.0 \times 10^6$ cm$^2$/cm$^3$ or less.

In this specification, the values prescribed in the requirement (I) and further the requirement (II) are values measured by the methods described in the section of Examples as mentioned later.

In addition, the values prescribed in the requirement (I) and further the requirement (II) are able to be adjusted chiefly by production conditions of the urea-based thickener (B).

The respective components which are contained in the grease composition of the present invention are hereunder described in detail while paying attention to specific means for adjusting the values prescribed in the requirement (I) and further the requirement (II).

<Base Oil (A)>

The base oil (A) which is contained in the grease composition of the present invention may be a base oil which is generally used for grease compositions, and examples thereof include at least one selected from a mineral oil and a synthetic oil.

Examples of the mineral oil include a distillate obtained by subjecting a paraffinic crude oil, an intermediate base crude oil, or a naphthenic crude oil to atmospheric distillation or vacuum distillation; and a refined oil obtained by refining the foregoing distillate.

Examples of the purification method for obtaining a refined oil include a hydroreforming treatment, a solvent extraction treatment, a solvent dewaxing treatment, a hydroisomerization dewaxing treatment, a hydrorefining treatment, and a clay treatment.

Examples of the synthetic oil include a hydrocarbon-based oil, an aromatic oil, an ester-based oil, and an ether-based oil. In addition, examples thereof also include a synthetic oil obtained by isomerizing a wax (GTL wax) produced by the Fischer-Tropsch process or the like.

Examples of the hydrocarbon-based oil include a poly-α-olefin (PAO), such as normal paraffin, isoparaffin, polybutene, polyisobutylene, a 1-decene oligomer, and a cooligomer of 1-decene and ethylene; and a hydrogenated product thereof.

Examples of the aromatic oil include an alkylbenzene, such as a monoalkylbenzene and a dialkylbenzene; and an alkylnaphthalene, such as a monoalkylnaphthalene, a dialkylnaphthalene, and a polyalkylnaphthalene.

Examples of the ester-based oil include a diester-based oil, such as dibutyl sebacate, di-2-ethylhexyl sebacate, dioctyl adipate, diisodecyl adipate, ditridecyl adipate, ditridecyl glutarate, and methyl acetyl ricinolate; an aromatic ester-based oil, such as trioctyl trimellitate, tridecyl trimellitate, and tetraoctyl pyromellitate; a polyol ester-based oil, such as trimethylolpropane caprylate, trimethylolpropane pelargonate, pentaerythritol-2-ethylhexanoate, and pentaerythritol pelargonate; and a complex ester-based oil, such as an oligoester of a polyhydric alcohol with a mixed fatty acid of a dibasic acid and a monobasic acid.

Examples of the ether-based oil include a polyglycol, such as polyethylene glycol, polypropylene glycol, polyethylene glycol monoether, and polypropylene glycol monoether; and a phenyl ether-based oil, such as a monoalkyl triphenyl ether, an alkyl diphenyl ether, a dialkyl diphenyl ether, pentaphenyl ether, tetraphenyl ether, a monoalkyl tetraphenyl ether, and a dialkyl tetraphenyl ether.

Here, in the case where the grease composition is required to have oxidation stability at a high temperature, it is preferred to use a synthetic oil, and it is more preferred to use at least one selected from a hydrocarbon-based oil, an ester-based oil, and an ether-based oil. In addition, by using a mixture of a hydrocarbon-based oil, an ester-based oil, and an ether-based oil, a balance can also be kept among heat resistance, sealing resistance, and low-temperature characteristics.

A kinematic viscosity at 40° C. (hereinafter also referred to as "40° C. kinematic viscosity") of the base oil (A) which is used in one embodiment of the present invention is preferably 10 to 400 mm²/s, more preferably 15 to 300 mm²/s, and still more preferably 20 to 150 mm²/s.

As the base oil (A) which is used in one embodiment of the present invention, a mixed base oil prepared by combining a high-viscosity base oil and a low-viscosity base oil to control the kinematic viscosity to the aforementioned range may be used.

A viscosity index of the base oil (A) which is used in one embodiment of the present invention is preferably 70 or more, more preferably 80 or more, and still more preferably 100 or more.

In this specification, the kinematic viscosity and the viscosity index each mean a value measured or calculated in conformity with JIS K2283:2000.

In the grease composition of one embodiment of the present invention, the content of the base oil (A) is preferably 50% by mass or more, more preferably 55% by mass or more, still more preferably 60% by mass or more, and yet still more preferably 65% by mass or more, and it is preferably 98.5% by mass or less, more preferably 97% by mass or less, still more preferably 95% by mass or less, and yet still more preferably 93% by mass or less, on the basis of the total amount (100% by mass) of the grease composition.

<Urea-Based Thickener (B)>

Although the urea-based thickener (B) which is contained in the grease composition of the present invention may be a compound having a urea bond, a diurea compound having two urea bonds is preferred, and a diurea compound represented by the following general formula (b1) is more preferred.

$$R^1\text{—NHCONH—}R^3\text{—NHCONH—}R^2 \quad (b1)$$

The urea-based thickener (B) which is used in one embodiment of the present invention may be used alone or may be used in combination of two or more thereof.

In the general formula (b1), $R^1$ and $R^2$ each independently represent a monovalent hydrocarbon group having 6 to 24 carbon atoms; $R^1$ and $R^2$ may be the same as or different from each other; and $R^3$ represents a divalent aromatic hydrocarbon group having 6 to 18 carbon atoms.

Although the carbon number of the monovalent hydrocarbon group which can be selected as $R^1$ and $R^2$ in the general formula (b1) is 6 to 24, it is preferably 6 to 20, and more preferably 6 to 18.

Examples of the monovalent hydrocarbon group which can be selected as $R^1$ and $R^2$ include a saturated or unsaturated monovalent chain hydrocarbon group, a saturated or unsaturated monovalent alicyclic hydrocarbon group, and a monovalent aromatic hydrocarbon group.

Here, in $R^1$ and $R^2$ in the general formula (b1), when a content rate of the chain hydrocarbon group is designated as an X molar equivalent, a content rate of the alicyclic hydrocarbon group is designated as a Y molar equivalent, and a content rate of the aromatic hydrocarbon group is designated as a Z molar equivalent, it is preferred that the following requirements (a) and (b) are satisfied.

Requirement (a):

A value of $\{[(X+Y)/(X+Y+Z)]\times100\}$ is 90 or more (preferably 95 or more, more preferably 98 or more, and still more preferably 100).

Requirement (b):

An X/Y ratio is 0/100 (X=0, Y=100) to 100/0 (X=100, Y=0) (preferably 10/90 to 90/10, more preferably 20/80 to 80/20, and still more preferably 40/60 to 80/20).

In view of the fact that the aforementioned alicyclic hydrocarbon group, the aforementioned chain hydrocarbon group, and the aforementioned aromatic hydrocarbon group are each a group to be selected as $R^1$ and $R^2$ in the general formula (b1), the sum total of the X, Y, and Z values is 2 molar equivalents per mol of the compound represented by the general formula (b1). In addition, the values of the requirements (a) and (b) each mean an average value relative to the total amount of the group of the compounds represented by the general formula (b1), which are contained in the grease composition.

By using the compound represented by the general formula (b1), which is satisfied with the requirements (a) and (b), it is easy to provide a grease composition which is excellent in both the torque transmitting efficiency and the leakage prevention performance and also excellent in the wear resistance and the load resistance while making both lubricating life and lubricating performance of the grease composition compatible with each other.

The X, Y, and Z values can be calculated from a molar equivalent of each amine to be used as a raw material.

As the monovalent saturated chain hydrocarbon group, there is exemplified a linear or branched alkyl group having 6 to 24 carbon atoms. Specifically, examples thereof include a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, an octadecenyl group, a nonadecyl group, and an eicosyl group.

As the monovalent unsaturated chain hydrocarbon group, there is exemplified a linear or branched alkenyl group having 6 to 24 carbon atoms. Specifically, examples thereof include a hexenyl group, a heptenyl group, an octenyl group, a nonenyl group, a decenyl group, a dodecenyl group, a tridecenyl group, a tetradecenyl group, a pentadecenyl group, a hexadecenyl group, an octadecenyl group, a nonadecenyl group, an eicosenyl group, an oleyl group, a geranyl group, a farnesyl group, and a linoleyl group.

The monovalent saturated chain hydrocarbon group and the monovalent unsaturated chain hydrocarbon group each may be a linear chain or a branched chain.

Examples of the monovalent saturated alicyclic hydrocarbon group include a cycloalkyl group, such as a cyclohexyl group, a cycloheptyl group, a cyclooctyl group, and a cyclononyl group; and a cycloalkyl group substituted with an alkyl group having 1 to 6 carbon atoms (preferably a cyclohexyl group substituted with an alkyl group having 1 to 6 carbon atoms), such as a methylcyclohexyl group, a dimethylcyclohexyl group, an ethylcyclohexyl group, a diethylcyclohexyl group, a propylcyclohexyl group, an isopropylcyclohexyl group, a 1-methyl-propylcyclohexyl group, a butylcyclohexyl group, a pentylcyclohexyl group, a pentyl-methylcyclohexyl group, and a hexylcyclohexyl group.

Examples of the monovalent unsaturated alicyclic hydrocarbon group include a cycloalkenyl group, such as a cyclohexenyl group, a cycloheptenyl group, and a cyclooctenyl group; and a cycloalkenyl group substituted with an alkyl group having 1 to 6 carbon atoms (preferably a cyclohexenyl group substituted with an alkyl group having 1 to 6 carbon atoms), such as a methylcyclohexenyl group, a dimethylcyclohexenyl group, an ethylcyclohexenyl group, a diethylcyclohexenyl group, and a propylcyclohexenyl group.

Examples of the monovalent aromatic hydrocarbon group include a phenyl group, a biphenyl group, a terphenyl group, a naphthyl group, a diphenylmethyl group, a diphenylethyl group, a diphenylpropyl group, a methylphenyl group, a dimethylphenyl group, an ethylphenyl group, and a propylphenyl group.

Although the carbon number of the divalent aromatic hydrocarbon group which can be selected as $R^3$ in the general formula (b1) is 6 to 18, it is preferably 6 to 15, and more preferably 6 to 13.

Examples of the divalent aromatic hydrocarbon group which can be selected as $R^3$ include a phenylene group, a diphenylmethylene group, a diphenylethylene group, a diphenylpropylene group, a methylphenylene group, a dimethylphenylene group, and an ethylphenylene group.

Of these, a phenylene group, a diphenylmethylene group, a diphenylethylene group, or a diphenylpropylene group is preferred, and a diphenylmethylene group is more preferred.

In the grease composition of one embodiment of the present invention, the content of the component (B) is preferably 1.0 to 15.0% by mass, more preferably 1.5 to 13.0% by mass, still more preferably 2.0 to 10.0% by mass, yet still more preferably 2.5 to 8.0% by mass, and even yet still more preferably 2.5 to 6.0% by mass on the basis of the total amount (100% by mass) of the grease composition.

When the content of the component (B) is 1.0% by mass or more, it is easy to adjust the worked penetration of the resulting grease composition to an appropriate range. In addition, it is easy to make the leakage prevention performance favorable.

Meanwhile, when the content of the component (B) is 15.0% by mass or less, the resulting grease composition can be adjusted soft, and therefore, it is easy to make the lubricating properties favorable, and the torque transmitting efficiency is readily improved.

<Method for Producing Urea-Based Thickener (B)>

The urea-based thickener (B) can be typically obtained by reacting an isocyanate compound with a monoamine. The reaction is preferably performed by adding a solution β obtained by dissolving a monoamine in the base oil (A) to a heated solution α obtained by dissolving the isocyanate compound in the base oil (A).

For example, in the case where a compound represented by the general formula (b1) is synthesized, a diisocyanate having a group corresponding to a divalent aromatic hydrocarbon group represented by $R^3$ in the general formula (b1) is used as an isocyanate compound, and an amine having a group corresponding to a monovalent hydrocarbon group represented by $R^1$ and $R^2$ is used as a monoamine, whereby a desired urea-based thickener (B) can be synthesized according to the aforementioned method.

In order to satisfy the requirement (I) and further the requirement (II), from the viewpoint of miniaturizing the urea-based thickener (B) in the grease composition, it is preferred to produce the grease composition containing the component (A) and the component (B) by using a grease manufacturing apparatus as expressed in the following [1].

[1] A grease manufacturing apparatus including a container body having an introduction portion into which a grease raw material is introduced and a discharge portion for discharging the grease into the outside; and a rotor having a rotation axis in an axial direction of an inner periphery of the container body and rotatably provided in the inside of the container body, the rotor including a first concave-convex portion in which (i) concave and convex are alternately provided along a surface of the rotor, the concave and convex being inclined to the rotation axis, and (ii) a feeding ability from the introduction portion to a direction of the discharge portion is provided.

While the grease manufacturing apparatus as set forth in the above [1] is hereunder described, the term "preferred" prescribed below is the embodiment from the viewpoint of miniaturizing the urea-based thickener (B) in the grease composition so as to satisfy the requirement (I) and further the requirement (II), unless otherwise specifically indicated.

FIG. 1 is a schematic cross-sectional view of the grease manufacturing apparatus as set forth in the above [1] that can be used in one embodiment of the present invention.

A grease manufacturing apparatus 1 shown in FIG. 1 includes a container body 2 for introducing a grease raw material into the inside thereof, and a rotor 3 having a rotation axis 12 on a central axis line of an inner periphery of the container body 2 and rotating around the rotation axis 12 as a center axis.

The rotor 3 rotates at high speed around the rotation axis 12 as a center axis to apply a high shearing force to a grease raw material inside the container body 2. Thus, the grease containing the urea-based thickener is produced.

As shown in FIG. 1, the container body 2 is preferably partitioned to an introduction portion 4, a retention portion 5, a first inner peripheral surface 6, a second inner peripheral surface 7, and a discharge portion 8 in this order from an upstream side.

As shown in FIG. 1, it is preferred that the container body 2 has an inner peripheral surface forming such a truncated cone shape that an inner diameter thereof gradually increases from the introduction portion 4 toward the discharge portion 8.

The introduction portion 4 serving as one end of the container body 2 is provided with a plurality of solution introducing pipes 4A and 4B for introducing a grease raw material from the outside of the container body 2.

The retention portion 5 is disposed in a downstream portion of the introduction portion 4, and is a space for temporarily retaining the grease raw material introduced from the introduction portion 4. When the grease raw material is retained in the retention portion 5 for a long time, grease adhered to an inner peripheral surface of the retention portion 5 forms a large lump, so that it is preferred to transport the grease raw material to the first inner peripheral surface 6 in the downstream side in a short time as far as possible. More preferably, it is preferred to transport the grease raw material directly to the first inner peripheral surface 6 without passing through the retention portion 5.

The first inner peripheral surface 6 is disposed in a downstream portion adjacent to the retention portion 5, and the second inner peripheral surface 7 is disposed in a downstream portion adjacent to the first inner peripheral surface 6. As mentioned later in detail, it is preferred to provide a first concave-convex portion 9 on the first inner peripheral surface 6 and to provide a second concave-convex portion 10 on the second inner peripheral surface 7, for the purpose of allowing the first inner peripheral surface 6 and the second inner peripheral surface 7 to function as a high shearing portion for imparting a high shearing force to the grease raw material or grease.

The discharge portion 8 serving as the other end of the container body 2 is a part for discharging the grease agitated on the first inner peripheral surface 6 and the second inner peripheral surface 7, and is provided with a discharge port 11 for discharging grease. The discharge port 11 is formed in a direction orthogonal or approximately orthogonal to the rotation axis 12. According to this, the grease is discharged from the discharge port 11 to the direction orthogonal or approximately orthogonal to the rotation axis 12. However, the discharge port 11 does not necessarily have to be made orthogonal to the rotation axis 12, and may be formed in a direction parallel or approximately parallel to the rotation axis 12.

The rotor 3 is rotatably provided on the center axis line of the inner peripheral surface of the container body 2, which has a truncated cone shape, as a rotation axis 12, and rotates counterclockwise when the container body 2 is viewed from the upstream portion to a downstream portion as shown in FIG. 1.

The rotor 3 has an outer peripheral surface that expands in accordance with the enlargement of the inner diameter of the truncated cone of the container body 2, and the outer peripheral surface of the rotor 3 and the inner peripheral surface of the truncated cone of the container body 2 are maintained at a constant interval.

On the outer peripheral surface of the rotor 3, a first concave-convex portion 13 of the rotor in which concave and convex are alternately provided along a surface of the rotor 3 is provided.

The first concave-convex portion 13 of the rotor is inclined to the rotation axis 12 of the rotor 3 in the direction of from the introduction portion 4 to the discharge portion 8, and has a feeding ability in the direction of from the introduction portion 4 to the discharge portion 8. That is, the first concave-convex portion 13 of the rotor is inclined in the direction in which the solution is pushed toward the downstream side when the rotor 3 rotates in the direction shown in FIG. 1.

A step difference between a concave portion 13A and a convex portion 13B of the first concave-convex portion 13 of the rotor is preferably 0.3 to 30, more preferably 0.5 to 15, and still more preferably 2 to 7, when a diameter of the concave portion 13A on the outer peripheral surface of the rotor 3 is 100.

The number of convex portions 13B of the first concave-convex portion 13 of the rotor in the circumferential direction is preferably 2 to 1,000, more preferably 6 to 500, and still more preferably 12 to 200.

A ratio of the width of the convex portion 13B to the width of the concave portion 13A of the first concave-convex portion 13 of the rotor [(width of the convex portion)/(width of the concave portion)] in a cross section orthogonal to the rotation axis 12 of the rotor 3 is preferably 0.01 to 100, more preferably 0.1 to 10, and still more preferably 0.5 to 2.

An inclination angle of the first concave-convex portion 13 of the rotor with respect to the rotation axis 12 is preferably 2 to 85°, more preferably 3 to 45°, and still more preferably 5 to 20°.

It is preferred that the first inner peripheral surface 6 of the container body 2 is provided with the first concave-convex portion 9 formed with a plurality of concave and convex along the inner peripheral surface thereof.

It is preferred that the concave and convex of the first concave-convex portion 9 on the side of the container body 2 are inclined in the opposite direction to the first concave-convex portion 13 of the rotor.

That is, it is preferred that the plurality of concave and convex of the first concave-convex portion 9 on the side of the container body 2 be inclined in the direction in which the solution is pushed toward the downstream side when the rotation axis 12 of the rotor 3 rotates in the direction shown in FIG. 1. The stirring ability and the discharge ability are further enhanced by the first concave-convex portion 9 having the plurality of concave and convex provided on the first inner peripheral surface 6 of the container body 2.

A depth of the concave and convex of the first concave-convex portion 9 on the side of the container body 2 is preferably 0.2 to 30, more preferably 0.5 to 15, and still more preferably 1 to 5, when the inner diameter (diameter) of the container is set to 100.

The number of concave and convex of the first concave-convex portion 9 on the side of the container body 2 is preferably 2 to 1,000, more preferably 6 to 500, and still more preferably 12 to 200.

A ratio of the width of the concave portion to the width of the convex portion between grooves in the concave and convex of the first concave-convex portion 9 on the side of the container body 2 [(width of the concave portion)/(width of the convex portion)] is preferably 0.01 to 100, more preferably 0.1 to 10, and still more preferably 0.5 to 2 or less.

An inclination angle of the concave and convex of the first concave-convex portion 9 on the side of the container body 2 to the rotation axis 12 is preferably 2 to 85°, more preferably 3 to 45°, and still more preferably 5 to 20°.

By providing the first concave-convex portion 9 on the first inner peripheral surface 6 of the container body 2, the first inner peripheral surface 6 can be made to function as a shearing portion for imparting a high shearing force to the grease raw material or grease, but the first concave-convex portion 9 does not necessarily have to be provided.

It is preferred that a second concave-convex portion 14 of a rotor having concave and convex alternately provided along the surface of the rotor 3 is provided on an outer peripheral surface of a downstream portion of the first concave-convex portion 13 of the rotor.

The second concave-convex portion 14 of the rotor is inclined to the rotation axis 12 of the rotor 3, and has a feeding suppression ability to push the solution back toward the upstream side from the introduction portion 4 toward the discharge portion 8.

A step difference of the second concave-convex portion 14 of the rotor is preferably 0.3 to 30, more preferably 0.5 to 15, and still more preferably 2 to 7, when a diameter of the concave portion of the outer peripheral surface of the rotor 3 is set to 100.

The number of convex portions of the second concave-convex portion 14 of the rotor in the circumferential direction is preferably 2 to 1,000, more preferably 6 to 500, and still more preferably 12 to 200.

A ratio of the width of the convex portion to the width of the concave portion of the second concave-convex portion 14 of the rotor in the cross section orthogonal to the rotation axis of the rotor 3 [(width of the convex portion)/(width of the concave portion)] is preferably 0.01 to 100, more preferably 0.1 to 10, and still more preferably 0.5 to 2.

An inclination angle of the second concave-convex portion 14 of the rotor to the rotation axis 12 is preferably 2 to 85°, more preferably 3 to 45°, and still more preferably 5 to 20°.

It is preferred that the second inner peripheral surface 7 of the container body 2 is provided with the second concave-convex portion 10 formed with a plurality of concave and convex adjacent to a downstream portion of the concave and convex in the first concave-convex portion 9 on the side of the container body 2.

It is preferred that the plurality of concave and convex are formed on the inner peripheral surface of the container body 2, and that the concave and convex are inclined in opposite directions to the inclination direction of the second concave-convex portion 14 of the rotor.

That is, it is preferred that the plurality of concave and convex of the second concave-convex portion 10 on the side of the container body 2 are inclined in the direction in which the solution is pushed back toward the upstream side when the rotation axis 12 of the rotor 3 rotates in the direction shown in FIG. 1. A stirring ability is more enhanced by the concave and convex of the second concave-convex portion 10 provided on the second inner peripheral surface 7 of the container body 2. In addition, the second inner peripheral surface 7 of the container body can function as a shearing portion which imparts a high shearing force to the grease raw material or grease.

A depth of the concave portion of the second concave-convex portion 10 on the side of the container body 2 is preferably 0.2 to 30, more preferably 0.5 to 15, and still more preferably 1 to 5, when the inner diameter (diameter) of the container body 2 is set to 100.

The number of concave portions of the second concave-convex portion 10 on the side of the container body 2 is preferably 2 to 1,000, more preferably 6 to 500, and still more preferably 12 to 200.

A ratio of the width of the convex portion to the width of the concave portion of the concave and convex of the second concave-convex portion 10 on the side of the container body 2 in the cross section orthogonal to the rotation axis 12 of the rotor 3 [(width of the convex portion)/(width of the concave portion)] is preferably 0.01 to 100, more preferably 0.1 to 10, and still more preferably 0.5 to 2 or less.

An inclination angle of the second concave-convex portion 10 on the side of the container body 2 to the rotation axis 12 is preferably 2 to 85°, more preferably 3 to 45°, and still more preferably 5 to 20°.

A ratio of the length of the first concave-convex portion 9 on the side of the container body 2 to the length of the second concave-convex portion 10 on the side of the container body 2 [(length of the first concave-convex portion)/(length of the second concave-convex portion)] is preferably 2/1 to 20/1.

Figure 2:
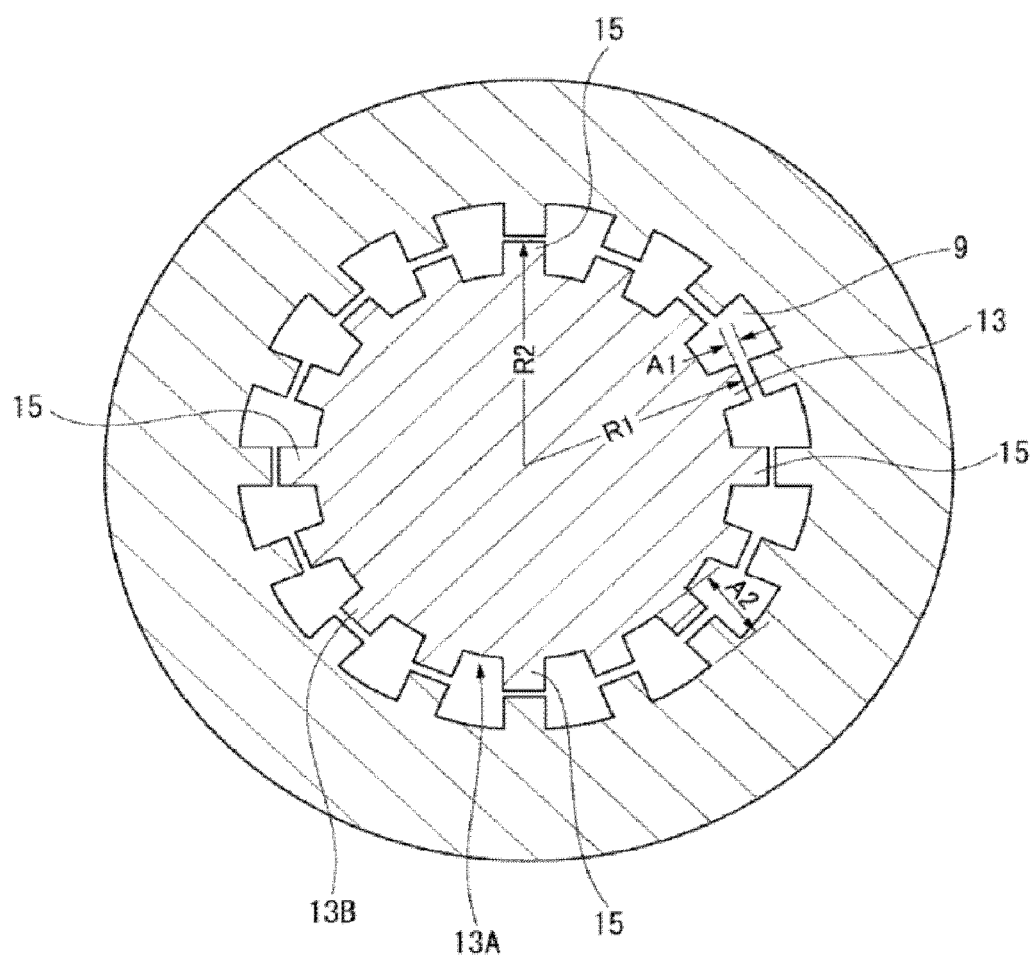
FIG. 2 is a schematic cross-sectional view of the direction orthogonal to a rotation axis in a first concave-convex portion on the side of a container body of the grease manufacturing apparatus of FIG. 1.

FIG. 2 is a cross-sectional view of the direction orthogonal to the rotation axis 12 in the first concave-convex portion 9 on the side of the container body 2 of the grease manufacturing apparatus 1.

In the first concave-convex portion 13 of the rotor shown in FIG. 2, a plurality of scrapers 15 each having a tip protruding toward the inner peripheral surface side of the container body 2 beyond a tip in the projecting direction of the convex portion 13B of the first concave-convex portion 13 are provided. In addition, though not shown, the second concave-convex portion 14 is also provided with a plurality of scrapers in which a tip of the convex portion protrudes toward the inner peripheral surface side of the container body 2, similarly to the first concave-convex portion 13.

The scraper 15 scrapes off the grease adhered to the inner peripheral surface of the first concave-convex portion 9 on the side of the container body 2 and the second concave-convex portion 10 on the side of the container body 2.

With respect to protrusion amount of the tip of the scraper 15 relative to protrusion amount of the convex portion 13B of the first concave-convex portion 13 of the rotor, a ratio [R2/R1] of the radius (R2) of the tip of the scraper 15 to the radius (R1) of the tip of the convex portion 13B is preferably more than 1.005 and less than 2.0.

The number of scrapers 15 is preferably 2 to 500, more preferably 2 to 50, and still more preferably 2 to 10.

In the grease manufacturing apparatus 1 shown in FIG. 2, the scraper 15 is provided, but may not be provided, or may be provided intermittently.

In order to produce the grease containing the urea-based thickener (B) by the grease manufacturing apparatus 1, the solution α and the solution β which are the aforementioned grease raw materials are introduced respectively from the solution introducing pipes 4A and 4B of the introduction portion 4 of the container body 2, and the rotor 3 is rotated at a high speed, whereby the grease base material containing the urea-based thickener (B) can be produced.

Then, even by blending the extreme pressure agent (C) and the other additive (D) with the thus obtained grease base material, the urea-based thickener in the grease composition can be miniaturized so as to satisfy the requirement (I) and further the requirement (II).

As a high-speed rotation condition of the rotor 3, a shear rate applied to the grease raw material is preferably $10^2$ $s^{-1}$ or more, more preferably $10^3$ $s^{-1}$ or more, and still more preferably $10^4$ $s^{-1}$ or more, and it is typically $10^7$ $s^{-1}$ or less.

A ratio of a maximum shear rate (Max) to a minimum shear rate (Min) in the shearing at the time of high-speed rotation of the rotor 3 (Max/Min) is preferably 100 or less, more preferably 50 or less, and still more preferably 10 or less.

In view of the fact that the shear rate relative to the mixed solution is as uniform as possible, the urea-based thickener or a precursor thereof in the grease composition is readily miniaturized, whereby a more uniform grease structure is provided.

Here, the maximum shear rate (Max) is a highest shear rate applied to the mixed solution, and the minimum shear rate (Min) is a lowest shear rate applied to the mixed solution, which are defined as follows.

Maximum shear rate (Max)=(linear velocity at the tip of the convex portion 13B of the first concave-convex portion 13 of the rotor)/(gap A1 between the tip of the convex portion 13B of the first concave-convex portion 13 of the rotor and the convex portion of the first concave-convex portion 9 of the first inner peripheral surface 6 of the container body 2)

Minimum shear rate (Min)=(linear velocity of the concave portion 13A of the first concave-convex portion 13 of the rotor)/(gap A2 between the concave portion 13A of the first concave-convex portion 13 of the rotor and the concave portion of the first concave-convex portion 9 on the first inner peripheral surface 6 of the container body 2)

The gap A1 and the gap A2 are as shown in FIG. 2.

The grease manufacturing apparatus 1 is provided with the scraper 15, thereby grease adhered to the inner peripheral surface of the container body 2 can be scraped off, so that the generation of the lumps during kneading can be prevented, and the grease in which the urea-based thickener is miniaturized can be continuously produced in a short time.

In view of the fact that the scraper 15 scrapes off the grease adhered thereto, it is possible to prevent the retained grease from becoming a resistance to rotation of the rotor 3, so that the rotational torque of the rotor 3 can be reduced, and the power consumption of the drive source can be reduced, thereby making it possible to continuously produce the grease efficiently.

Since the inner peripheral surface of the container body 2 is in a shape of a truncated cone whose inner diameter increases from the introduction portion 4 toward the discharge portion 8, the centrifugal force has an effect for discharging the grease or grease raw material in the downstream direction, and the rotation torque of the rotor 3 can be reduced to continuously produce the grease.

Since the first concave-convex portion 13 of the rotor is provided on the outer peripheral surface of the rotor 3, the first concave-convex portion 13 of the rotor is inclined to the rotation axis 12 of the rotor 3, the first concave-convex portion 13 has a feeding ability from the introduction portion 4 to the discharge portion 8, the second concave-convex portion 14 of the rotor is inclined to the rotation axis 12 of the rotor 3, and the second concave-convex portion 14 has a feeding suppression ability from the introduction portion 4 to the discharge portion 8, a high shear force can be given to the solution, and the urea-based thickener (B) in the grease composition can be miniaturized so as to satisfy the requirement (I) and further the requirement (II) even after blending the additive.

Since the first concave-convex portion 9 is formed on the first inner peripheral surface 6 of the container body 2 and is inclined in the opposite direction to the first concave-convex portion 13 of the rotor, in addition to the effect of the first concave-convex portion 13 of the rotor, sufficient stirring of grease raw material can be carried out while extruding the grease or grease raw material in the downstream direction, and the urea-based thickener (B) in the grease composition can be miniaturized so as to satisfy the requirement (I) and further the requirement (II) even after blending the additive.

The second concave-convex portion 10 is provided on the second inner peripheral surface 7 of the container body 2, and the second concave-convex portion 14 of the rotor is provided on the outer peripheral surface of the rotor 3, thereby the grease raw material can be prevented from flowing out from the first inner peripheral surface 6 of the container body more than necessary, so that the urea-based thickener (B) can be miniaturized so as to satisfy the requirement (I) and further the requirement (II) even after blending the additive by giving a high shear force to the solution to highly disperse the grease raw material.

<Extreme Pressure Agent (C)>

The grease composition of the present invention contains an extreme pressure agent (C) together with the component (A) and the component (B).

In general, in the grease composition containing the urea-based thickener (B), even when the extreme pressure agent (C) is added, the performance of the extreme pressure agent (C) is hardly exhibited, and it is difficult to give the wear resistance and the load resistance to the grease composition by the extreme pressure agent (C). However, as a result of extensive and intensive investigations made by the present inventor, it has been surprisingly noted that in the grease composition satisfying the requirement (I) and further the requirement (II), the performance of the extreme pressure agent (C) is extremely readily exhibited, and a grease composition which is excellent in wear resistance and load resistance is readily provided.

The extreme pressure agent (C) which is used in the grease composition of the present invention is at least one selected from an organic metal-based extreme pressure agent, a sulfur-based extreme pressure agent, a phosphorus-based extreme pressure agent, and a sulfur-phosphorus-based extreme pressure agent.

Of these, from the viewpoint of more improving the wear resistance and the load resistance, at least one selected from an organic metal-based extreme pressure agent, or a combination of a sulfur-based extreme pressure agent, a phosphorus-based extreme pressure agent, and a sulfur-phosphorus-based extreme pressure agent is preferably used, and at least one selected from an organic metal-based extreme pressure agent is more preferably used.

The organic metal-based extreme pressure agent, the sulfur-based extreme pressure agent, the phosphorus-based extreme pressure agent, and the sulfur-phosphorus-based extreme pressure agent are hereunder described.

(Organic Metal-Based Extreme Pressure Agent)

As the organic metal-based extreme pressure agent, for example, at least one selected from an organic molybdenum-based compound, such as a molybdenum dialkyldithiocarbamate (MoDTC) and a molybdenum dialkyldithiophosphate (MoDTP); and an organic zinc-based compound, such as a zinc dialkyldithiocarbamate (ZnDTC) and a zinc dialkyldithiophosphate (ZnDTP) can be used.

Of these, from the viewpoint of further improving the wear resistance and the load resistance, any one of a molybdenum dialkyldithiocarbamate (MoDTC) and a zinc dialkyldithiophosphate (ZnDTP) is preferably used, and a combination thereof is more preferably used.

In the case of using a combination of a molybdenum dialkyldithiocarbamate (MoDTC) and a zinc dialkyldithiophosphate (ZnDTP), a content ratio of the molybdenum dialkyldithiocarbamate (MoDTC) and the zinc dialkyldithiophosphate (ZnDTP) [(MoDTC)/(ZnDTP)] is preferably 1/10 to 10/1, more preferably 1/5 to 5/1, and still more preferably 1/3 to 3/1 in terms of a mass ratio.

(Sulfur-Based Extreme Pressure Agent)

As the sulfur-based extreme pressure agent, for example, at least one selected from a sulfurized fat, sulfurized fatty oil, a sulfurized fatty acid, a sulfurized ester, a sulfurized olefin, a monosulfide, a polysulfide, a dihydrocarbyl polysulfide, a thiadiazole compound, an alkyl thiocarbamoyl compound, a thiocarbamate compound, a thioterpene compound, and a dialkyl thiodipropionate compound can be used.

Of these, from the viewpoint of further improving the wear resistance and the load resistance, any one of a sulfurized fat, sulfurized fatty oil and a thiocarbamate compound is preferably used, and a combination thereof is more preferably used.

(Phosphorus-Based Extreme Pressure Agent)

As the phosphorus-based extreme pressure agent, for example, at least one selected from a phosphoric acid ester, such as an aryl phosphate, an alkyl phosphate, an alkenyl phosphate, and an alkylaryl phosphate; an acidic phosphoric acid ester, such as a monoaryl acid phosphate, a diaryl acid phosphate, a monoalkyl acid phosphate, a dialkyl acid phosphate, a monoalkenyl acid phosphate, and a dialkenyl aid phosphate; a phosphorous acid ester, such as an aryl hydrogen phosphite, an alkyl hydrogen phosphite, an aryl phosphite, an alkyl phosphite, an alkenyl phosphite, and an arylalkyl phosphite; an acidic phosphorous acid ester, such as a monoalkyl acid phosphite, a dialkyl acid phosphite, a monoalkenyl acid phosphite, and a dialkenyl acid phosphite; and an amine salt thereof can be used.

Of these, from the viewpoint of further improving the wear resistance and the load resistance, an amine salt of an acidic phosphoric acid ester is preferably used.

(Sulfur-Phosphorus-Based Extreme Pressure Agent)

As the sulfur-phosphorus-based extreme pressure agent, for example, at least one selected from a monoalkyl thiophosphate, a dialkyl dithiophosphate, a trialkyl trithiophosphate, and an amine salt thereof and a zinc dialkyl dithiophosphate (Zn-DTP) can be used.

Of these, from the viewpoint of further improving the wear resistance and the load resistance, a monoalkyl thiophosphate is preferably used.

(Embodiment of Combination of Sulfur-Based Extreme Pressure Agent, Phosphorus-Based Extreme Pressure Agent, and Sulfur-Phosphorus-Based Extreme Pressure Agent)

As an embodiment of the combination of a sulfur-based extreme pressure agent, a phosphorus-based extreme pressure agent, and a sulfur-phosphorus-based extreme pressure agent, there are exemplified combinations of the above-exemplified compounds. However, from the viewpoint of further improving the wear resistance and the load resistance, combinations of a sulfurized fat, sulfurized-fatty oil, a thiocarbamate compound, an amine salt of an acidic phosphoric acid ester, and a monoalkyl thiophosphate are preferred.

The sulfur-based extreme pressure agent, the phosphorus-based extreme pressure agent, and the sulfur-phosphorus-based extreme pressure agent are each preferably a metal-free compound.

The content of the extreme pressure agent (C) in the grease composition of one embodiment of the present invention is preferably 0.1 to 10% by mass, more preferably 0.5 to 8.0% by mass, and still more preferably 1.0 to 6.0% by mass on the basis of the total amount (100% by mass) of the grease composition.

<Additive (D)>

The grease composition of one embodiment of the present invention may contain an additive (D) other than the component (B) and the component (C), which is blended in general greases, within a range where the effects of the present invention are not impaired.

Examples of the additive (D) include an antioxidant, a rust inhibitor, a dispersant, and a metal deactivator.

The additives (D) each may be used alone or may be used in combination of two or more thereof.

Examples of the antioxidant include an amine-based antioxidant, such as a diphenylamine-based compound and a naphthylamine-based compound; and a phenol-based antioxidant, such as a monocyclic phenol-based compound and a polycyclic phenol-based compound.

Examples of the rust inhibitor include a carboxylic acid-based rust inhibitor, such as an alkenyl succinic acid polyhydric alcohol ester, zinc stearate, thiadiazole and a derivative thereof, and benzotriazole and a derivative thereof.

Examples of the dispersant include an ashless dispersant, such as succinimide and a boron-based succinimide.

Examples of the metal deactivator include a benzotriazole-based compound.

In the grease composition of one embodiment of the present invention, the contents of the additives (D) are each independently typically 0.01 to 20% by mass, preferably 0.01 to 15% by mass, more preferably 0.01 to 10% by mass, and still more preferably 0.01 to 7% by mass on the basis of the total amount (100% by mass) of the grease composition.

<Method of Blending Extreme Pressure Agent (C) and Additive (D)>

The grease composition of the present invention can be produced by mixing the grease containing the base oil (A) and the urea-based thickener (B) as synthetized by the aforementioned method, with the extreme pressure agent (C) and further optionally the additive (D).

For example, the grease composition of the present invention can be produced by blending the pressure extreme agent (C) and further optionally the additive (D) in the grease, followed by stirring, or blending the extreme pressure agent (C) and further optionally additive (D) in the grease while stirring the grease.

<Physical Properties of Grease Composition of the Present Invention>

(Worked Penetration at 25° C.)

A worked penetration at 25° C. of the grease composition of one embodiment of the present invention is preferably 240 to 450, more preferably 260 to 450, still more preferably 300 to 450, yet still more preferably 340 to 450, and even yet still more preferably 380 to 450.

According to the grease composition of one embodiment of the present invention, even in the case where the worked penetration at 25° C. is adjusted to the aforementioned range, the leakage prevention performance of the grease composition is excellent, and a grease composition which is excellent in torque transmitting efficiency and leakage prevention performance is provided.

In this specification, the worked penetration of the grease composition means a value measured at 25° C. in accordance with the ASTM D217 test method.

(Torque Transmitting Efficiency)

With respect to the grease composition of one embodiment of the present invention, a torque transmitting efficiency measured and calculated by the method described in the section of Examples as mentioned later is preferably 50% or more, more preferably 60% or more, still more preferably 70% or more, and yet still more preferably 80% or more.

(Leakage Prevention Performance)

With respect to the grease composition of one embodiment of the present invention, a grease leakage rate measured and calculated by the method described in the section of Examples as mentioned later is preferably less than 5.0%, more preferably 2.0% or less, still more preferably 1.0% or less, yet still more preferably 0.5% or less, and even yet still more preferably 0%.

(Wear Resistance)

With respect to the grease composition of one embodiment of the present invention, a wear resistance (fretting wear) measured by the method described in the section of Examples as mentioned later in conformity with ASTM D4170 is preferably 15 mg or less, more preferably 10 mg or less, still more preferably 8 mg or less, and yet still more preferably 7 mg or less.

(Load Resistance)

With respect to the grease composition of one embodiment of the present invention, a load resistance (weld load: WL) measured and calculated by the method described in the section of Examples as mentioned later in conformity with ASTM D2596 is preferably more than 1,961 N, more preferably 2,452 N or more, and still more preferably 3,089 N or more.

<Application of Grease Composition of the Present Invention>

The grease composition of the present invention is excellent in both torque transmitting efficiency and leakage prevention performance and also excellent in wear resistance and load resistance.

Therefore, the grease composition of one embodiment of the present invention can be used for lubricating portions to be lubricated, such as a bearing portion, a sliding portion, a gear portion, or a joint portion, in an apparatus which is required to have such characteristics. More specifically, it is particularly preferred to use it in a bearing portion of a hub unit, an electric power steering, a driving electric motor flywheel, a ball joint, a wheel bearing, a spline portion, a constant velocity joint, a clutch booster, a servo motor, a blade bearing, or a bearing portion of a generator.

Examples of the field of the apparatus for which the grease composition of the present invention can be suitably used include the automobile field, the office equipment field, the machine-tool field, the windmill field, the field for construction, the field for agricultural machine, and the industrial robot field. Examples of the portion to be lubricated in the apparatus for the automotive field, in which the grease composition of the present invention can be suitably used, include bearing portions in an apparatus, such as a radiator fan motor, a fan coupling, an alternator, an idler pulley, a hub unit, a water pump, a power window, a wiper, an electric power steering, a driving electric motor fly wheel, a ball joint, wheel bearing, a spline portion, and a constant velocity joint; and bearing portions, gear portions, or sliding portions in an apparatus, such as a door lock, a door hinge, and a clutch booster.

Examples of the portion to be lubricated in the apparatus for the field of business equipment, in which the grease composition of the present invention can be suitably used, include a fixing roll in an apparatus, such as a printer, and bearing and gear portions in an apparatus, such as a polygon motor.

Examples of the portion to be lubricated in the apparatus for the field of machine tools, in which the grease composition of the present invention can be suitably used, include bearing portions in a reduction gear, such as a spindle, a servo motor, and a working robot.

Examples of the portion to be lubricated in the apparatus for the field of machine tools, in which the grease composition of the present invention can be suitably used, include bearing portions in a reduction gear, such as a spindle, a servo motor, and a working robot.

Examples of the portion to be lubricated in the apparatus for the field of windmill, in which the grease composition of the present invention can be suitably used, include a blade bearing and bearing portions in a generator. Examples of the portion to be lubricated in the apparatus for the field of construction or agricultural machinery, in which the grease composition of the present invention can be suitably used, include bearing portions, gear portions, and sliding portions, such as a ball joint and a spline part. The grease composition of the present invention can be suitably used for a speed reducer provided in an industrial robot, etc. and a speed increaser provided in a wind turbine generator system, etc.

Examples of the speed reducer and the speed increaser include a speed reducer composed of a gear mechanism and a speed increaser composed of a gear mechanism. However, the object of application of the grease composition of one embodiment of the present invention is not limited to the speed reducer composed of a gear mechanism and the speed increaser composed of a gear mechanism, and for example, the grease composition of one embodiment of the present invention can also be applied to a traction drive and the like.

In addition, in one embodiment of the present invention, an apparatus having the grease composition of the present invention in a lubricating site, such as a bearing portion, a sliding portion, a gear portion, and a joint portion, preferably a speed reducer or a speed increaser, is provided.

Furthermore, in one embodiment of the present invention, a lubricating method for lubricating a lubricating site of an apparatus, such as a speed reducer and a speed increase (for example, a bearing portion, a sliding portion, a gear portion, and a joint portion) with the grease composition of the present invention is provided.

EXAMPLES

The present invention is hereunder specifically described by reference to Examples, but it should be construed that the present invention is not limited to the following Examples.

[Various Physical Properties Values]

The measurement methods of various physical properties values are as follows.

(1) Kinematic Viscosity at 40° C., Kinematic Viscosity at 100° C., and Viscosity Index The measurement and calculation were performed in conformity with JIS K2283:2000.

(2) Worked Penetration

The measurement was performed at 25° C. according to the ASTM D217 method.

[Raw Materials]

In Examples 1 to 8 and Comparative Examples 1 to 7, the base oil (A), the extreme pressure agent (C), and the additive (D) which were used as raw materials for preparing the grease composition are as follows.

(1) Base Oil (A)

Base oil (A1): Paraffinic mineral oil having a kinematic viscosity at 40° C. of 50 $mm^2/s$ Base oil (A2): Paraffinic mineral oil having a kinematic viscosity at 40° C. of 100 $mm^2/s$ Base oil (A3): Poly-α-olefin (PAO) having a kinematic viscosity at 40° C. of 50 $mm^2/s$ Base oil (A4): Poly-α-olefin (PAO) having a kinematic viscosity at 40° C. of 100 $mm^2/s$ (2) Extreme Pressure Agent (C)

Extreme pressure agent (C1): Phosphorus-based extreme pressure agent 1 (acidic phosphoric acid ester amine salt)

Extreme pressure agent (C2): Sulfur-based extreme pressure agent 1 (dithiocarbamate compound)

Extreme pressure agent (C3): Sulfur-phosphorus-based extreme pressure agent 1 (monoalkyl thiophosphate)

Extreme pressure agent (C4): Sulfur-based extreme pressure agent 2 (sulfurized fat)

Extreme pressure agent (C5): Organic metal-based extreme pressure agent 1 (zinc dithiophosphate)

Extreme pressure agent (C6): Organic metal-based extreme pressure agent 2 (molybdenum dithiocarbamate)

(3) Additive (D)

Additive (D1): Rust inhibitor (Zn stearate)

Additive (D2): Antioxidant (monobutylphenylmonooctylphenylamine)

Additive (D3): Copper deactivator (Na sulfonate)

Example 1

(1) Synthesis of Urea Grease (x-1)

To 41.39 parts by mass of the base oil (A1), 4.71 parts by mass of diphenylmethane-4,4'-diisocyanate (MDI) was added to prepare a solution α.

In addition, to 38.74 parts by mass of the separately prepared base oil (A1), 5.91 parts by mass of octadecylamine and 1.45 parts by mass of cyclohexylamine were added to prepare a solution β.

Then, using the grease manufacturing apparatus 1 shown in FIG. 1, the solution α which had been heated at 70° C. was introduced at a flow rate of 150 L/h from the solution introducing pipe 4A into the container body 2, and the solution β which had been heated at 70° C. was simultaneously introduced at a flow rate of 150 L/h from the solution introducing pipe 4B into the container body 2, and the solution α and the solution β were unintermittently continuously introduced into the container body 2 in a state of rotating the rotor 3, thereby synthesizing a urea grease (x-1).

The rotation number of the rotator 3 of the grease manufacturing apparatus 1 used was 8,000 rpm. In addition, on this occasion, a maximum shear rate (Max) was 10,500 $s^{-1}$, and stirring was performed by setting a ratio of a maximum shear rate (Max) to a minimum shear rate (Min) [Max/Min] to 3.5.

The urea-based thickener contained in the urea grease (x-1) is corresponding to a compound represented by the general formula (b1) wherein Ru and $R^2$ are selected from an octadecyl group and a cyclohexyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (X1)

In the above (1), the urea grease (x-1) discharged from the grease manufacturing apparatus 1 shown in FIG. 1 was stirred and then cooled by natural cooling, to which were then added the extreme pressure agent (C5) and the extreme pressure agent (C6), and also the additive (D1), the additive (D2), and the additive (D3) in blending amounts shown in Table 1, to obtain a grease composition (X1).

Example 2

(1) Synthesis of Urea Grease (x-2)

To 42.22 parts by mass of the base oil (A1), 3.88 parts by mass of diphenylmethane-4,4'-diisocyanate (MDI) was added to prepare a solution α.

In addition, to 38.00 parts by mass of the separately prepared base oil (A1), 8.10 parts by mass of octadecylamine was added to prepare a solution β.

Then, using the grease manufacturing apparatus 1 shown in FIG. 1, a urea grease (x-2) was synthesized under the same conditions as in (1) of Example 1.

The urea-based thickener contained in the urea grease (x-2) is corresponding to a compound represented by the general formula (b1) wherein $R^1$ and $R^2$ are an octadecyl group, and $R^3$ is a diphenylmethylene group.

In addition, a molar ratio of octadecylamine and cyclohexylamine used as the raw materials (octadecylamine/cyclohexylamine) is 100/0.

(2) Preparation of Grease Composition (X2)

In the above (1), the urea grease (x-2) discharged from the grease manufacturing apparatus 1 shown in FIG. 1 was stirred and then cooled by natural cooling, to which were then added the extreme pressure agent (C5) and the extreme pressure agent (C6) and also the additive (D1), the additive (D2), and the additive (D3) in blending amounts shown in Table 1, to obtain a grease composition (X2).

Example 3

(1) Synthesis of Urea Grease (x-3)

To 40.61 parts by mass of the base oil (A1), 5.49 parts by mass of diphenylmethane-4,4'-diisocyanate (MDI) was added to prepare a solution α.

In addition, to 40.60 parts by mass of the separately prepared base oil (A1), 5.50 parts by mass of octylamine was added to prepare a solution β.

Then, using the grease manufacturing apparatus 1 shown in FIG. 1, a urea grease (x-3) was synthesized under the same conditions as in (1) of Example 1.

The urea-based thickener contained in the urea grease (x-3) is corresponding to a compound represented by the general formula (b1) wherein $R^1$ and $R^2$ are an octyl group, and $R^3$ is a diphenylmethylene group.

In addition, a molar ratio of octylamine and cyclohexylamine used as the raw materials (octylamine/cyclohexylamine) is 100/0.

(2) Preparation of Grease Composition (X3)

In the above (1), the urea grease (x-3) discharged from the grease manufacturing apparatus 1 shown in FIG. 1 was stirred and then cooled by natural cooling, to which were then added the extreme pressure agent (C5) and the extreme pressure agent (C6) and also the additive (D1), the additive (D2), and the additive (D3) in blending amounts shown in Table 1, to obtain a grease composition (X3).

Example 4

(1) Synthesis of Urea Grease (x-4)

To 44.25 parts by mass of the base oil (A1), 1.95 parts by mass of diphenylmethane-4,4'-diisocyanate (MDI) was added to prepare a solution α.

In addition, to 43.15 parts by mass of the separately prepared base oil (A1), 2.45 parts by mass of octadecylamine and 0.60 parts by mass of cyclohexylamine were added to prepare a solution β.

Then, using the grease manufacturing apparatus 1 shown in FIG. 1, a urea grease (x-4) was synthesized under the same conditions as in (1) of Example 1.

The urea-based thickener contained in the urea grease (x-4) is corresponding to a compound represented by the general formula (b1) wherein $R^1$ and $R^2$ are selected from an octadecyl group and a cyclohexyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (X4)

In the above (1), the urea grease (x-4) discharged from the grease manufacturing apparatus 1 shown in FIG. 1 was stirred and then cooled by natural cooling, to which were then added the extreme pressure agent (C1), the extreme pressure agent (C2), the extreme pressure agent (C3), and the extreme pressure agent (C4) and also the additive (D1), the additive (D2), and the additive (D3) in blending amounts shown in Table 1, to obtain a grease composition (X4).

Example 5

(1) Synthesis of Urea Grease (x-5)

To 44.34 parts by mass of the base oil (A3), 1.76 parts by mass of diphenylmethane-4,4'-diisocyanate (MDI) was added to prepare a solution α.

In addition, to 43.36 parts by mass of the separately prepared base oil (A3), 2.20 parts by mass of octadecylamine and 0.54 parts by mass of cyclohexylamine were added to prepare a solution β.

Then, using the grease manufacturing apparatus 1 shown in FIG. 1, a urea grease (x-5) was synthesized under the same conditions as in (1) of Example 1.

The urea-based thickener contained in the urea grease (x-5) is corresponding to a compound represented by the general formula (b1) wherein $R^1$ and $R^2$ are selected from an octadecyl group and a cyclohexyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (X5)

In the above (1), the urea grease (x-5) discharged from the grease manufacturing apparatus 1 shown in FIG. 1 was stirred and then cooled by natural cooling, to which were then added the extreme pressure agent (C5) and the extreme pressure agent (C6) and also the additive (D1), the additive (D2), and the additive (D3) in blending amounts shown in Table 1, to obtain a grease composition (X5).

Example 6

(1) Synthesis of Urea Grease (x-6)

To 44.90 parts by mass of the base oil (A2), 1.20 parts by mass of diphenylmethane-4,4'-diisocyanate (MDI) was added to prepare a solution α.

In addition, to 44.22 parts by mass of the separately prepared base oil (A2), 1.51 parts by mass of octadecylamine and 0.37 parts by mass of cyclohexylamine were added to prepare a solution β.

Then, using the grease manufacturing apparatus 1 shown in FIG. 1, a urea grease (x-6) was synthesized under the same conditions as in (1) of Example 1.

The urea-based thickener contained in the urea grease (x-6) is corresponding to a compound represented by the general formula (b1) wherein $R^1$ and $R^2$ are selected from an octadecyl group and a cyclohexyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (X6)

In the above (1), the urea grease (x-6) discharged from the grease manufacturing apparatus 1 shown in FIG. 1 was stirred and then cooled by natural cooling, to which were then added the extreme pressure agent (C5) and the extreme pressure agent (C6) and also the additive (D1), the additive (D2), and the additive (D3) in blending amounts shown in Table 1, to obtain a grease composition (X6).

Example 7

(1) Synthesis of Urea Grease (x-7)

To 45.00 parts by mass of the base oil (A2), 1.20 parts by mass of diphenylmethane-4,4'-diisocyanate (MDI) was added to prepare a solution α.

In addition, to 44.32 parts by mass of the separately prepared base oil (A2), 1.51 parts by mass of octadecylamine and 0.37 parts by mass of cyclohexylamine were added to prepare a solution β.

Then, using the grease manufacturing apparatus 1 shown in FIG. 1, a urea grease (x-7) was synthesized under the same conditions as in (1) of Example 1.

The urea-based thickener contained in the urea grease (x-7) is corresponding to a compound represented by the general formula (b1) wherein $R^1$ and $R^2$ are selected from an octadecyl group and a cyclohexyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (X7)

In the above (1), the urea grease (x-7) discharged from the grease manufacturing apparatus 1 shown in FIG. 1 was stirred and then cooled by natural cooling, to which were then added the extreme pressure agent (C1), the extreme pressure agent (C2), the extreme pressure agent (C3), and the extreme pressure agent (C4) and also the additive (D1), the additive (D2), and the additive (D3) in blending amounts shown in Table 1, to obtain a grease composition (X7).

Example 8

(1) Synthesis of Urea Grease (x-8)

To 44.15 parts by mass of the base oil (A1), 1.95 parts by mass of diphenylmethane-4,4'-diisocyanate (MDI) was added to prepare a solution α.

In addition, to 43.05 parts by mass of the separately prepared base oil (A1), 2.45 parts by mass of octadecylamine and 0.60 parts by mass of cyclohexylamine were added to prepare a solution β.

Then, using the grease manufacturing apparatus 1 shown in FIG. 1, a urea grease (x-8) was synthesized under the same conditions as in (1) of Example 1.

The urea-based thickener contained in the urea grease (x-8) is corresponding to a compound represented by the general formula (b1) wherein $R^1$ and $R^2$ are selected from an octadecyl group and a cyclohexyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (X8)

In the above (1), the urea grease (x-8) discharged from the grease manufacturing apparatus 1 shown in FIG. 1 was stirred and then cooled by natural cooling, to which were then added the extreme pressure agent (C5) and the extreme pressure agent (C6) and also the additive (D1), the additive (D2), and the additive (D3) in blending amounts shown in Table 1, to obtain a grease composition (X8).

Comparative Example 1

(1) Synthesis of Urea Grease (y-1)

To 40.25 parts by mass of the base oil (A1), 5.85 parts by mass of diphenylmethane-4,4'-diisocyanate (MDI) was added to prepare a solution α.

In addition, to 36.96 parts by mass of the separately prepared base oil (A1), 7.34 parts by mass of octadecylamine and 1.80 parts by mass of cyclohexylamine were added to prepare a solution β.

Figure 3:
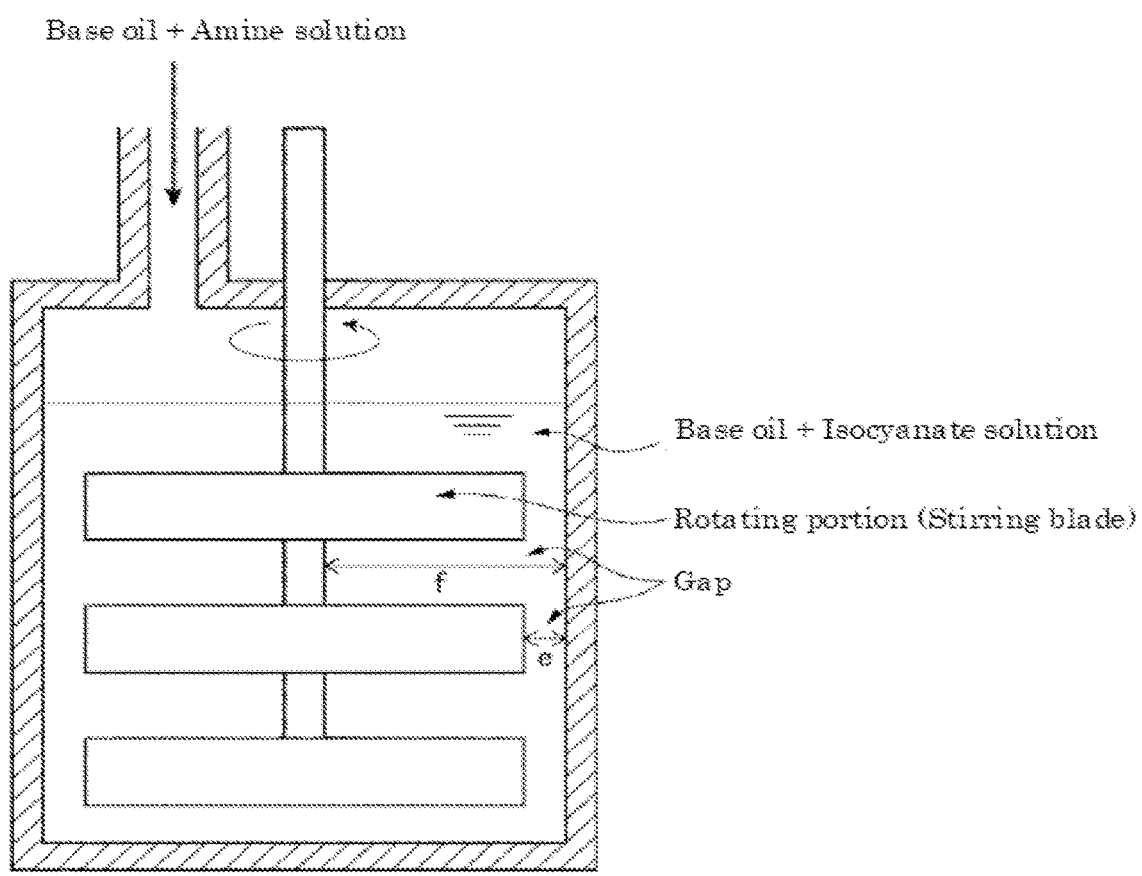
FIG. 3 is a schematic cross-sectional view of a grease manufacturing apparatus used in the Comparative Examples.

Then, using a grease manufacturing apparatus shown in FIG. 3, the solution α which had been heated at 70° C. was introduced at a flow rate of 504 L/h from a solution introducing pipe into a container body. Thereafter, the solution β which had been heated at 70° C. was introduced at a flow rate of 144 L/h from the solution introducing pipe into the container body having the solution α charged therein. After introducing all of the solutions β into the container body, a stirrer was rotated, and the temperature was raised to 160° C. while continuing the stirring, followed by holding for 1 hour to synthesize a urea grease (y-1).

On this occasion, a maximum shear rate (Max) was 42,000 $s^{-1}$, and stirring was performed by setting a ratio of a maximum shear rate (Max) to a minimum shear rate (Min) [Max/Min] to 1.03.

The urea-based thickener contained in the urea grease (y-1) is corresponding to a compound represented by the general formula (b1) wherein $R^1$ and $R^2$ are selected from a cyclohexyl group and an octadecyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (Y1)

In the above (1), the urea grease (y-1) discharged from the grease manufacturing apparatus shown in FIG. 3 was stirred and then cooled by natural cooling, to which were then added the extreme pressure agent (C5) and the extreme pressure agent (C6), and also the additive (D1), the additive (D2), and the additive (D3) in blending amounts shown in Table 2, to obtain a grease composition (Y1).

Comparative Example 2

(1) Synthesis of Urea Grease (y-2)

To 45.09 parts by mass of the base oil (A3), 1.01 parts by mass of diphenylmethane-4,4'-diisocyanate (MDI) was added to prepare a solution α.

In addition, to 44.53 parts by mass of the separately prepared base oil (A3), 1.26 parts by mass of octadecylamine and 0.31 parts by mass of cyclohexylamine were added to prepare a solution β.

Then, using the grease manufacturing apparatus shown in FIG. 3, a urea grease (y-2) was synthesized under the same conditions as in (1) of Comparative Example 1.

The urea-based thickener contained in the urea grease (y-2) is corresponding to a compound represented by the general formula (b1) wherein $R^1$ and $R^2$ are selected from a cyclohexyl group and an octadecyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (Y2)

In the above (1), the urea grease (y-2) discharged from the grease manufacturing apparatus shown in FIG. 3 was stirred and then cooled by natural cooling, to which were then added the extreme pressure agent (C5) and the extreme pressure agent (C6) and also the additive (D1), the additive (D2), and the additive (D3) in blending amounts shown in Table 2, to obtain a grease composition (Y2).

Comparative Example 3

(1) Synthesis of Urea Grease (y-3)

To 44.35 parts by mass of the base oil (A4), 3.90 parts by mass of diphenylmethane-4,4'-diisocyanate (MDI) was added to prepare a solution α.

In addition, to 42.16 parts by mass of the separately prepared base oil (A4), 4.89 parts by mass of octadecylamine and 1.20 parts by mass of cyclohexylamine were added to prepare a solution β.

Then, using the grease manufacturing apparatus shown in FIG. 3, a urea grease (Y3) was synthesized under the same conditions as in (1) of Comparative Example 1.

The urea-based thickener contained in the urea grease (y-3) is corresponding to a compound represented by the general formula (b1) wherein $R^1$ and $R^2$ are selected from a cyclohexyl group and an octadecyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (Y3)

In the above (1), the urea grease (y-3) discharged from the grease manufacturing apparatus shown in FIG. 3 was stirred and then cooled by natural cooling, to which were then added the additive (D1), the additive (D2), and the additive (D3) in blending amounts shown in Table 2, to obtain a grease composition (Y3).

Comparative Example 4

(1) Synthesis of Urea Grease (y-4)

To 44.15 parts by mass of the base oil (A1), 1.95 parts by mass of diphenylmethane-4,4'-diisocyanate (MDI) was added to prepare a solution α.

In addition, to 43.05 parts by mass of the separately prepared base oil (A1), 2.45 parts by mass of octadecylamine and 0.60 parts by mass of cyclohexylamine were added to prepare a solution β.

Then, using the grease manufacturing apparatus shown in FIG. 3, a urea grease (y-4) was synthesized under the same conditions as in (1) of Comparative Example 1.

The urea-based thickener contained in the urea grease (y-4) is corresponding to a compound represented by the general formula (b1) wherein $R^1$ and $R^2$ are selected from a cyclohexyl group and an octadecyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (Y4)

In the above (1), the urea grease (y-4) discharged from the grease manufacturing apparatus shown in FIG. 3 was stirred and then cooled by natural cooling, to which were then added the extreme pressure agent (C5) and the extreme pressure agent (C6) and also the additive (D1), the additive (D2), and the additive (D3) in blending amounts shown in Table 2, to obtain a grease composition (Y4).

Comparative Example 5

(1) Synthesis of Urea Grease (y-5)

To 46.40 parts by mass of the base oil (A1), 1.95 parts by mass of diphenylmethane-4,4'-diisocyanate (MDI) was added to prepare a solution α.

In addition, to 45.30 parts by mass of the separately prepared base oil (A1), 2.45 parts by mass of octadecylamine and 0.60 parts by mass of cyclohexylamine were added to prepare a solution β.

Then, using the grease manufacturing apparatus shown in FIG. 3, a urea grease (y-5) was synthesized under the same conditions as in (1) of Comparative Example 1.

The urea-based thickener contained in the urea grease (y-5) is corresponding to a compound represented by the general formula (b1) wherein $R^1$ and $R^2$ are selected from a cyclohexyl group and an octadecyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (Y5)

In the above (1), the urea grease (y-5) discharged from the grease manufacturing apparatus shown in FIG. 3 was stirred and then cooled by natural cooling, to which were then added the additive (D1), the additive (D2), and the additive (D3) in blending amounts shown in Table 2, to obtain a grease composition (Y5).

Comparative Example 6

(1) Synthesis of Urea Grease (y-6)

To 44.25 parts by mass of the base oil (A1), 1.95 parts by mass of diphenylmethane-4,4'-diisocyanate (MDI) was added to prepare a solution α.

In addition, to 43.15 parts by mass of the separately prepared base oil (A1), 2.45 parts by mass of octadecylamine and 0.60 parts by mass of cyclohexylamine were added to prepare a solution β.

Then, using the grease manufacturing apparatus shown in FIG. 3, a urea grease (y-6) was synthesized under the same conditions as in Synthesis Example Y1.

The urea-based thickener contained in the urea grease (y-6) is corresponding to a compound represented by the general formula (b1) wherein $R^1$ and $R^2$ are selected from a cyclohexyl group and an octadecyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (Y6)

In the above (1), the urea grease (y-6) discharged from the grease manufacturing apparatus shown in FIG. 3 was stirred and then cooled by natural cooling, to which were then added the extreme pressure agent (C1), the extreme pressure agent (C2), the extreme pressure agent (C3), and the extreme pressure agent (C4) and also the additive (D1), the additive (D2), and the additive (D3) in blending amounts shown in Table 2, to obtain a grease composition (Y6).

Comparative Example 7

(1) Synthesis of Urea Grease (y-7)

To 46.40 parts by mass of the base oil (A1), 1.95 parts by mass of diphenylmethane-4,4'-diisocyanate (MDI) was added to prepare a solution α.

In addition, to 45.30 parts by mass of the separately prepared base oil (A1), 2.45 parts by mass of octadecylamine and 0.60 parts by mass of cyclohexylamine were added to prepare a solution β.

Then, using the grease manufacturing apparatus 1 shown in FIG. 1, a urea grease (y-7) was synthesized under the same conditions as in (1) of Example 1.

The urea-based thickener contained in the urea grease (y-7) is corresponding to a compound represented by the general formula (b1) wherein $R^1$ and $R^2$ are selected from an octadecyl group and a cyclohexyl group, and $R^3$ is a diphenylmethylene group.

In addition, a molar ratio of octadecylamine and cyclohexylamine used as the raw materials (octadecylamine/cyclohexylamine) is 60/40.

(2) Preparation of Grease Composition (Y7)

In the above (1), the urea grease (y-7) discharged from the grease manufacturing apparatus 1 shown in FIG. 1 was stirred and then cooled by natural cooling, to which were then added the additive (D1), the additive (D2), and the additive (D3) in blending amounts shown in Table 2, to obtain a grease composition (Y7).

[Evaluation Methods]

With respect to the urea greases (x-1) to (x-8) and urea greases (y-1) to (y-7), or the grease composition (X1) to (X8) and grease compositions (Y1) to (Y7) as synthesized in Examples 1 to 8 and Comparative Examples 1 to 7, the following evaluations were performed.

<Evaluation of Particle Diameter: Requirement (I)>

The particle diameter of the particles containing the urea-based thickener (B) in the grease composition was evaluated. Specifically, each of the urea greases (x-1) to (x-8) and urea greases (y-1) to (y-7) as synthesized in Examples 1 to 8 and Comparative Examples 1 to 7 was used as a measurement sample and evaluated for the particle diameter of the particles containing the urea-based thickener (B) by the following procedures.

First, the measurement sample was defoamed in vacuum and then filled in a 1-mL syringe; 0.10 to 0.15 mL of the sample was extruded from the syringe; and the extruded sample was placed on a surface of a platy cell of a fixture for paste cell.

Then, another platy cell was superimposed on the sample, thereby obtaining a measuring cell having the sample sandwiched by two sheets of the cells.

Using a laser diffraction type particle diameter analyzer (a trade name: LA-920 (manufactured by Horiba, Ltd.)), an arithmetic average particle diameter on an area basis of the particles in the sample of the measuring cell (particles containing the urea-based thickener (B)) was measured.

Here, the "arithmetic average particle diameter on an area basis" means a value obtained by arithmetically averaging the particle diameter distribution on an area basis.

The particle diameter distribution on an area basis is one expressing a frequency distribution of the particle diameter in the whole of particles as an object for measurement on the basis of an area calculated from the particle diameter (in detail, a cross-sectional area of particles having the foregoing particle diameter).

In addition, the value obtained by arithmetically averaging the particle diameter distribution on an area basis can be calculated according to the following equation (1).

$$\text{Arithmetic average particle diameter} = \Sigma\{q(J) \times X(J)\} \div \Sigma\{q(J)\} \quad (1)$$

In the equation (1), J means a division number of particle diameter; q(J) means a frequency distribution value (unit: %); and X(J) means a representative diameter (unit: μm) in a range of the J-th particle diameter.

<Evaluation of Specific Surface Area: Requirement (II)>

The specific surface area was calculated using the particle diameter distribution of the particles containing the urea-based thickener (B) in the grease composition as measured in the aforementioned section of <Evaluation of Particle Diameter: Requirement (I)>. Specifically, using the foregoing particle diameter distribution, the total of surface areas (unit: $cm^2$) of particles per unit volume (1 $cm^3$) was calculated, and this was designated as the specific surface area (unit: $cm^2/cm^3$).

<Evaluation of Torque Transmitting Efficiency>

Figure 4:
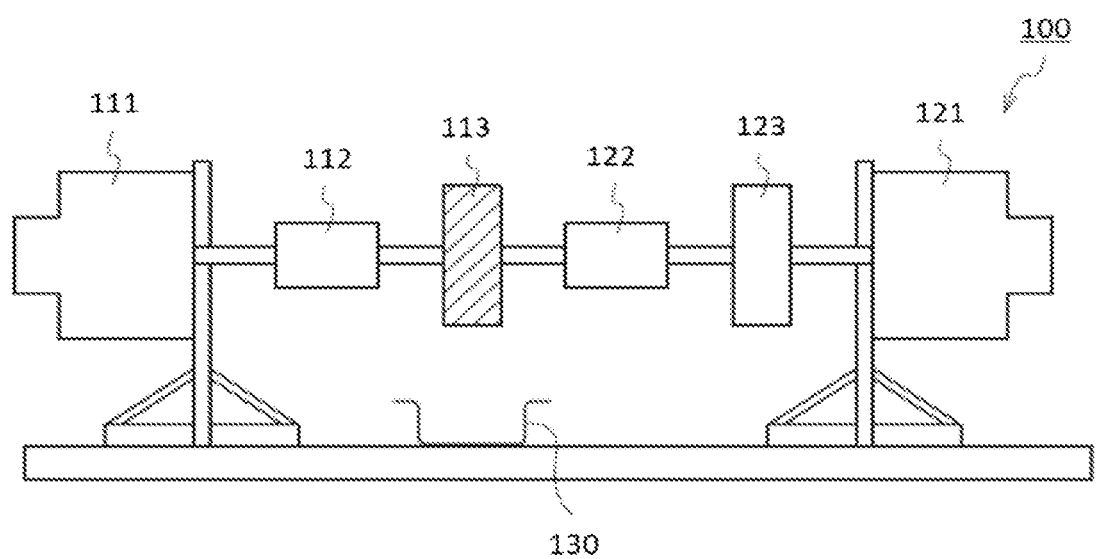
FIG. 4 is a diagrammatic view of a measurement apparatus used when measuring a torque transmitting efficiency in the present Examples.

FIG. 4 is a diagrammatic view of a measurement apparatus used when measuring the torque transmitting efficiency in the present Examples.

A measurement apparatus 100 shown in FIG. 4 is one in which an input side motor part 111, an input side torque measuring unit 112, an input side speed reducer 113 (manufactured by Nabtesco Corporation, a trade name: "RV-42N"), an output side torque meter 122, an output side speed reducer 123 (manufactured by by Nabtesco Corporation, a trade name: "RV-125V"), and an output side motor part 121 are connected in this order.

In a grease filling case (case inside temperature: 30° C.) which the input side speed reducer 113 of the measurement apparatus 1 shown in FIG. 4 had, 285 mL of the mixed grease was filled, and the measurement apparatus 100 was actuated under conditions at a load torque of 412 Nm and at a rotation number of 15 rpm; the rotation number and the torque on the input side and the output side were measured; and the torque transmitting efficiency was calculated according to the following equation (2).

[Torque transmitting efficiency (%)]=[Output side torque (Nm)]/[{Input side torque (Nm)}×(Speed reduction ratio)]×100    (2)

The speed reduction ratio is 141.

The torque transmitting efficiency is an index expressing the losing amount of an input power until it is output. It is meant that the lower the torque transmitting efficiency, the larger the power loss, and conversely, the higher the torque transmitting efficiency, the smaller the power loss.

<Evaluation of Wear Resistance>

Using the prepared grease composition, an oscillation operation was performed under the following conditions, and the wear amount (the amount of mass loss due to fretting wear) was measured in conformity with ASTM D4170.

Bearings: Thrust bearing 51203
Load: 2,940N
Oscillation angle: ±0.105 rad
Oscillation cycle: 25 Hz
Time: 22 h
Temperature: Room temperature (25° C.)
Enclosure amount of grease composition: 1.0 g per bearing set It may be said that the smaller the wear amount, the more excellent the wear resistance.

<Evaluation of Load Resistance>

The weld load (WL) was calculated with a four-ball tester under conditions at a rotation number of 1,800 rpm and at an oil temperature (18.3 to 35.0° C.) in conformity with ASTM D2596. It may be said that the larger the foregoing value, the more excellent the load resistance.

<Evaluation of Leakage Prevention Performance of Grease>

Using the measurement apparatus 100 shown in FIG. 5, which was used for evaluating the torque transmitting efficiency, in the grease filling case (case inside temperature: 60° C.) which the input side speed reducer 113 had, 285 mL (270.75 g) of the grease composition was filled; the measurement apparatus 100 was actuated under conditions at a load torque of 1,030 Nm and at a rotation number of 15 rpm; and the grease composition which had leaked from the input side speed reducer 113 during the actuation was recovered in a saucer 130 installed beneath the input side speed reducer 113.

Then, after actuating the measurement apparatus 100 for 280 hours, the "amount of leaked grease" accumulated in the saucer 130 was measured, and a grease leakage rate was calculated according to the following equation, thereby evaluating the grease leakage prevention performance.

[Grease leakage rate (%)]=[Amount of leaked grease (g)]/[Amount of filled grease (=270.75 g)]×100

It may be said that the smaller the grease leakage rate, the more excellent the grease leakage prevention performance.

The evaluation results are shown in Tables 1 and 2.

TABLE 1

| | | | Example 1 | Example 2 | Example 3 | Example 4 | Example 5 | Example 6 | Example 7 | Example 8 |
|---|---|---|---|---|---|---|---|---|---|---|
| Kind of urea grease | | | x-1 | x-2 | x-3 | x-4 | x-5 | x-6 | x-7 | x-8 |
| Grease composition | Kind of grease composition | | X1 | X2 | X3 | X4 | X5 | X6 | X7 | X8 |
| | Urea-based thickener (B) | Cyclohexylamine (% by mass) | 1.45 | — | — | 0.60 | 0.54 | 0.37 | 0.37 | 0.60 |
| | | Octylamine (% by mass) | — | — | 5.50 | — | — | — | — | — |
| | | Octadecylamine (% by mass) | 5.91 | 8.10 | — | 2.45 | 2.20 | 1.51 | 1.51 | 2.45 |
| | | MDI (% by mass) | 4.71 | 3.88 | 5.49 | 1.95 | 1.76 | 1.20 | 1.20 | 1.95 |
| | Extreme pressure agent (C) | Extreme pressure agent (C1) (% by mass) | — | — | — | 0.60 | — | — | 0.60 | — |
| | | Extreme pressure agent (C2) (% by mass) | — | — | — | 3.00 | — | — | 3.00 | — |
| | | Extreme pressure agent (C3) (% by mass) | — | — | — | 0.40 | — | — | 0.40 | — |
| | | Extreme pressure agent (C4) (% by mass) | — | — | — | 0.30 | — | — | 0.30 | — |
| | | Extreme pressure agent (C5) (% by mass) | 1.50 | 1.50 | 1.50 | — | 1.50 | 1.50 | — | 1.50 |
| | | Extreme pressure agent (C6) (% by mass) | 3.00 | 3.00 | 3.00 | — | 3.00 | 3.00 | — | 3.00 |
| | Additive (D) | Additive (D1) (% by mass) | 0.30 | 0.30 | 0.30 | 0.30 | 0.30 | 0.30 | 0.30 | 0.30 |
| | | Additive (D2) (% by mass) | 2.00 | 2.00 | 2.00 | 2.00 | 2.00 | 2.00 | 2.00 | 2.00 |
| | | Additive (D3) (% by mass) | 1.00 | 1.00 | 1.00 | 1.00 | 1.00 | 1.00 | 1.00 | 1.00 |
| | Base oil (A) | Base oil (A1) (% by mass) | 80.13 | 80.22 | 81.21 | 87.40 | — | — | — | 87.20 |
| | | Base oil (A2) (% by mass) | — | — | — | — | — | 89.12 | 89.32 | — |
| | | Base oil (A3) (% by mass) | — | — | — | — | 87.70 | — | — | — |
| | | Bass oil (A4) (% by mass) | — | — | — | — | — | — | — | — |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Evaluation results | Arithmetic average particle diameter of particles (μm) | ≤2.0 | ≤2.0 | ≤2.0 | ≤2.0 | ≤2.0 | ≤2.0 | ≤2.0 | ≤2.0 |
|  | Arithmetic average particle diameter of particles (found) (μm) | 0.7 | 0.6 | 0.6 | 0.3 | 0.3 | 0.2 | 0.2 | 0.3 |
|  | Specific surface area of particles (×$10^5$ cm$^2$/cm$^3$) | 0.80 | 1.10 | 1.00 | 2.10 | 2.20 | 2.90 | 2.80 | 2.20 |
|  | Worked penetration (at 25° C.) | 242 | 244 | 256 | 390 | 400 | 445 | 448 | 390 |
|  | Torque transmitting efficiency (%) | 54 | 55 | 57 | 82 | 84 | 87 | 84 | 85 |
|  | Wear resistance: ASTM D4170 wear amount (mg) | 2 | 3 | 1 | 11 | 4 | 3 | 6 | 3 |
|  | Load resistance: ASTM D2596 weld load (N) | 2452 | 2452 | 2452 | 2452 | 2452 | 3089 | 3089 | 2452 |
|  | Grease leakage rate (%) | 0 | 0 | 0 | 0 | 0 | 0 | 0 | 0 |

TABLE 2

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Kind of urea grease |  |  | y-1 | y-2 | y-3 | y-4 | y-5 | y-6 | y-7 |
| Grease composition | Kind of grease composition |  | Y1 | Y2 | Y3 | Y4 | Y5 | Y6 | Y7 |
|  | Urea-based thickener (B) | Cyclohexylamine (% by mass) | 1.80 | 0.31 | 1.20 | 0.60 | 0.60 | 0.60 | 0.60 |
|  |  | Octylamine (% by mass) | — | — | — | — | — | — | — |
|  |  | Octadecylamine (% by mass) | 7.34 | 1.26 | 4.89 | 2.45 | 2.45 | 2.45 | 2.45 |
|  |  | MDI (% by mass) | 5.85 | 1.01 | 3.90 | 1.95 | 1.95 | 1.95 | 1.95 |
|  | Extreme pressure agent (C) | Extreme pressure agent (C1) (% by mass) | — | — | — | — | — | 0.60 | — |
|  |  | Extreme pressure agent (C2) (% by mass) | — | — | — | — | — | 3.00 | — |
|  |  | Extreme pressure agent (C3) (% by mass) | — | — | — | — | — | 0.40 | — |
|  |  | Extreme pressure agent (C4) (% by mass) | — | — | — | — | — | 0.30 | — |
|  |  | Extreme pressure agent (C5) (% by mass) | 1.50 | 1.50 | — | 1.50 | — | — | — |
|  |  | Extreme pressure agent (C6) (% by mass) | 3.00 | 3.00 | — | 3.00 | — | — | — |
|  | Additive (D) | Additive (D1) (% by mass) | 0.30 | 0.30 | 0.50 | 0.30 | 0.30 | 0.30 | 0.30 |
|  |  | Additive (D2) (% by mass) | 2.00 | 2.00 | 2.00 | 2.00 | 2.00 | 2.00 | 2.00 |
|  |  | Additive (D3) (% by mass) | 1.00 | 1.00 | 1.00 | 1.00 | 1.00 | 1.00 | 1.00 |
|  | Base oil (A) | Base oil (A1) (% by mass) | 77.21 | — | — | 87.20 | 91.70 | 87.40 | 91.70 |
|  |  | Base oil (A2) (% by mass) | — | — | — | — | — | — | — |
|  |  | Base oil (A3) (% by mass) | — | 89.62 | — | — | — | — | — |
|  |  | Bass oil (A4) (% by mass) | — | — | 86.51 | — | — | — | — |
| Evaluation results | Arithmetic average particle diameter of particles (μm) |  | >2.0 | >2.0 | >2.0 | >2.0 | >2.0 | >2.0 | ≤2.0 |
|  | Arithmetic average particle diameter of particles (found) (μm) |  | 21.5 | 2.3 | 11.8 | 7.8 | 6.3 | 12.4 | 0.3 |
|  | Specific surface area of particles (×$10^5$ cm$^2$/cm$^3$) |  | 0.03 | 0.18 | 0.05 | 0.10 | 0.11 | 0.04 | 2.00 |
|  | Worked penetration (at 25° C.) |  | 170 | 470 | 280 | 380 | 380 | 380 | 390 |
|  | Torque transmitting efficiency (%) |  | 36 | 78 | 51 | 68 | 71 | 72 | 81 |
|  | Wear resistance: ASTM D4170 wear amount (mg) |  | 42 | 28 | 35 | 31 | 42 | 41 | 8 |
|  | Load resistance: ASTM D2596 weld load (N) |  | 1961 | 1569 | 785 | 1961 | 618 | 1569 | 981 |
|  | Grease leakage rate (%) |  | 0 | 12 | 5 | 14 | 17 | 9 | 0 |

The results of Tables 1 and 2 reveal as follows.

First, from comparison of Comparative Example 1 with Comparative Examples 2 to 6, it is noted that when the worked penetration is increased to prepare a soft grease composition, the grease leakage prevention performance cannot be secured.

In addition, from comparison of Comparative Examples 3 and 5 with Comparative Examples 1, 2, 4, and 6 and comparison of Comparative Example 7 with Examples 1 to 8, it is noted that the grease compositions of Examples 1 to 8 in which the extreme pressure agent (C) is blended, and the requirement (I) is satisfied are excellent in both the torque transmitting efficiency and the grease leakage prevention performance and are excellent in the effect of the extreme pressure agent (C), and as a result, these are also extremely favorable in the wear resistance and the load resistance. In particular, from comparison of Examples 1 to 3 with Examples 4 to 8, it is noted that even in the case where the worked penetration is increased, a grease composition which is more excellent in the torque transmitting efficiency and also extremely favorable in the wear resistance and the load resistance while making the grease leakage prevention performance excellent can be provided.

REFERENCE SIGNS LIST

1: Grease manufacturing apparatus
2: Container body
3: Rotor
4: Introduction portion
   4A, 4B: Solution introducing pipe
5: Retention portion
6: First concave-convex portion
7: Second concave-convex portion 8: Discharge portion
9: First concave-convex portion on the side of container body
10: Second concave-convex portion on the side of container body
11: Discharge port
12: Rotation axis
13: First concave-convex portion of rotor
  13A: Concave portion
  13B: Convex portion
14: Second concave-convex portion of rotor
15: Scraper
A1, A2: Gap

The invention claimed is:

1. A grease composition, consisting of:
  a base oil (A);
  a urea-based thickener (B);
  an extreme pressure agent (C), which is at least one selected from the group consisting of an organic metal-based extreme pressure agent, a sulfur-based extreme pressure agent, a phosphorus-based extreme pressure agent, and a sulfur-phosphorus-based extreme pressure agent; and
  optionally an additive (D), which is at least one selected from the group consisting of an antioxidant, a rust inhibitor, a dispersant, and a metal deactivator,
  wherein particles containing the urea-based thickener (B) in the grease composition
  have an arithmetic average particle diameter on an area basis as measured by a laser diffraction/scattering method of 2.0 μm or less, and
  a worked penetration at 25° C. of the grease composition is from 380 to 450.

2. The grease composition of claim 1, wherein the particles containing the urea-based thickener (B) in the grease composition
  has a specific surface area as measured by the laser diffraction/scattering method of $0.5 \times 10^5$ cm²/cm³ or more.

3. The grease composition of claim 1, wherein the extreme pressure agent (C) is included in an amount of from 0.1 to 10% by mass on the basis of a total amount of the grease composition.

4. The grease composition of claim 1, wherein the base oil (A) is at least one selected from the group consisting of a mineral oil, a hydrocarbon-based oil, an aromatic oil, an ester-based oil, and an ether-based oil.

5. The grease composition of claim 1, wherein a kinematic viscosity at 40° C. of the base oil (A) is from 10 to 400 mm²/s.

6. The grease composition of claim 1, wherein the urea-based thickener (B) is included in an amount of from 1 to 15% by mass on the basis of a total amount of the grease composition.

7. The grease composition of claim 1, having the worked penetration at 25° C. of from 400 to 450.

8. The grease composition of claim 1, wherein the urea-based thickener (B) is at least one diurea compound of formula (b1):

$$R^1\text{—NHCONH—}R^3\text{—NHCONH—}R^2 \qquad (b1)$$

wherein $R^1$ and $R^2$ each independently represent a monovalent hydrocarbon group having 6 to 24 carbon atoms; $R^1$ and $R^2$ is optionally the same as or different from each other; and $R^3$ represents a divalent aromatic hydrocarbon group having 6 to 18 carbon atoms.

9. The grease composition of claim 1, consisting of the base oil (A), the urea-based thickener (B), the extreme pressure agent (C), and the additive (D).

10. A speed reducer, comprising the grease composition of claim 1 in a lubricating site.

11. A speed increaser, comprising the grease composition of claim 1 in a lubricating site.

12. A lubricating method, comprising:
  lubricating a lubricating site of a speed reducer or a speed increaser with the grease composition of claim 1.

13. The grease composition of claim 1, consisting of the base oil (A), the urea-based thickener (B), and the extreme pressure agent (C).

* * * * *